US008317100B2

(12) United States Patent
Windauer et al.

(10) Patent No.: US 8,317,100 B2
(45) Date of Patent: *Nov. 27, 2012

(54) OPTICAL SIGHTING SYSTEM

(75) Inventors: Bernard T. Windauer, Kalispell, MT (US); William True McDonald, Darby, MT (US); Ted C. Almgren, Darby, MT (US)

(73) Assignee: AOSS, LLC, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/225,946

(22) Filed: Sep. 6, 2011

(65) Prior Publication Data

US 2012/0053878 A1 Mar. 1, 2012

Related U.S. Application Data

(63) Continuation of application No. 12/807,118, filed on Aug. 27, 2010, now Pat. No. 8,033,464, which is a continuation of application No. 11/720,426, filed as application No. PCT/US2005/043335 on Nov. 30, 2005, now Pat. No. 7,806,331.

(60) Provisional application No. 60/638,561, filed on Dec. 22, 2004, provisional application No. 60/632,331, filed on Nov. 30, 2004.

(51) Int. Cl.
*G06F 19/00* (2006.01)
(52) U.S. Cl. ........................................ 235/404; 89/41.18
(58) Field of Classification Search .................. 235/404, 235/407, 411, 412, 414, 416, 417; 89/41.18
See application file for complete search history.

(56) References Cited

U.S. PATENT DOCUMENTS

| | | | |
|---|---|---|---|
| 4,531,052 A | 7/1985 | Moore | |
| 4,777,352 A | 10/1988 | Moore | |
| 4,965,439 A | 10/1990 | Moore | |
| 5,026,158 A | 6/1991 | Golubic | |
| 5,033,219 A | 7/1991 | Johnson et al. | |
| 5,375,072 A | 12/1994 | Cohen | |
| 5,740,037 A | 4/1998 | McCann et al. | |
| 5,745,287 A | 4/1998 | Sauter | |
| 5,892,617 A | 4/1999 | Wallace | |
| 5,920,995 A | 7/1999 | Sammut | |
| 6,032,374 A | 3/2000 | Sammut | |
| 6,094,304 A | 7/2000 | Wallace et al. | |
| 6,252,706 B1 | 6/2001 | Kaladgew | |
| 6,516,699 B2 | 2/2003 | Sammut et al. | |

(Continued)

FOREIGN PATENT DOCUMENTS

EP 1 748 273 A1 1/2007

(Continued)

OTHER PUBLICATIONS

Canadian Office Action, Application No. 2,589,391, dated Jan. 8, 2009, 2 pages.

(Continued)

*Primary Examiner* — Karl D Frech
(74) *Attorney, Agent, or Firm* — Joseph P. Curtin, L.L.C.

(57) ABSTRACT

An automatic optical sighting system generates at least one adjustment for an adjustable optical system based on at least one detected condition, an appropriate dynamic model of a projectile in flight, and a solution of the equations of motion in flight, so that the projectile will have a trajectory between an origin and a selected target that helps the projectile to hit the target.

20 Claims, 22 Drawing Sheets

U.S. PATENT DOCUMENTS

| | | |
|---|---|---|
| 6,813,025 B2 | 11/2004 | Edwards |
| 6,862,832 B2 | 3/2005 | Barrett |
| 6,978,569 B2 | 12/2005 | Williamson, IV et al. |
| 7,162,825 B2 | 1/2007 | Ugolini et al. |
| 7,171,776 B2 | 2/2007 | Staley, III |
| 7,806,331 B2 | 10/2010 | Windauer et al. |
| 8,033,464 B2 * | 10/2011 | Windauer et al. ............. 235/404 |
| 2002/0129535 A1 | 9/2002 | Osborn, II |
| 2004/0020099 A1 | 2/2004 | Osborn, II |
| 2004/0025396 A1 | 2/2004 | Schlierbach et al. |
| 2004/0027275 A1 | 2/2004 | Vermillion |
| 2004/0088898 A1 | 5/2004 | Barrett |
| 2004/0212878 A1 | 10/2004 | Regen et al. |
| 2004/0231220 A1 | 11/2004 | McCormick |
| 2005/0039370 A1 | 2/2005 | Strong |
| 2005/0198885 A1 | 9/2005 | Staley et al. |
| 2005/0252062 A1 | 11/2005 | Scrogin et al. |
| 2005/0268521 A1 | 12/2005 | Cox et al. |
| 2006/0010760 A1 | 1/2006 | Perkins et al. |
| 2006/0010761 A1 | 1/2006 | Staley et al. |
| 2006/0048432 A1 | 3/2006 | Staley et al. |
| 2006/0077375 A1 | 4/2006 | Vermillion et al. |
| 2006/0096149 A1 | 5/2006 | Wooden |
| 2009/0139393 A1 | 6/2009 | Quinn |

FOREIGN PATENT DOCUMENTS

| | | |
|---|---|---|
| EP | 1 772 695 A1 | 4/2007 |

OTHER PUBLICATIONS

U.S. Appl. No. 60/552,292 to Staley, III, filed Mar. 10, 2004, 27 pages.

PCT/US05/43335 Search Report and Written Opinion, Apr. 20, 2007, 8 pages.

Office Action dated Sep. 15, 2009, in U.S. Appl. No. 11/720,426, 11 pages.

Final Office Action dated Mar. 26, 2010, in U.S. Appl. No. 11/720,426, 5 pages.

Office Action dated Nov. 12, 2010, in U.S. Appl. No. 12/807,118, 6 pages.

Final Office Action dated Feb. 25, 2011, in U.S. Appl. No. 12/807,118, 5 pages.

* cited by examiner

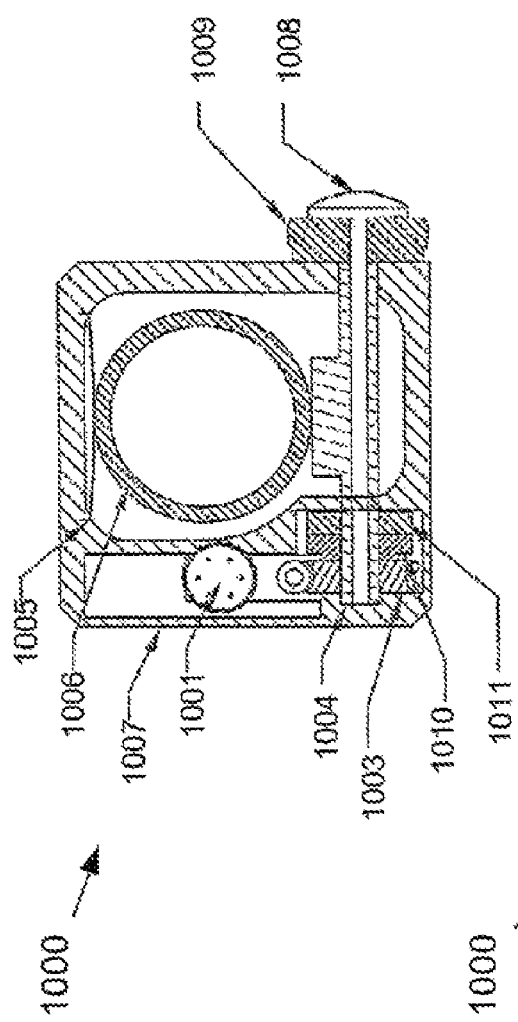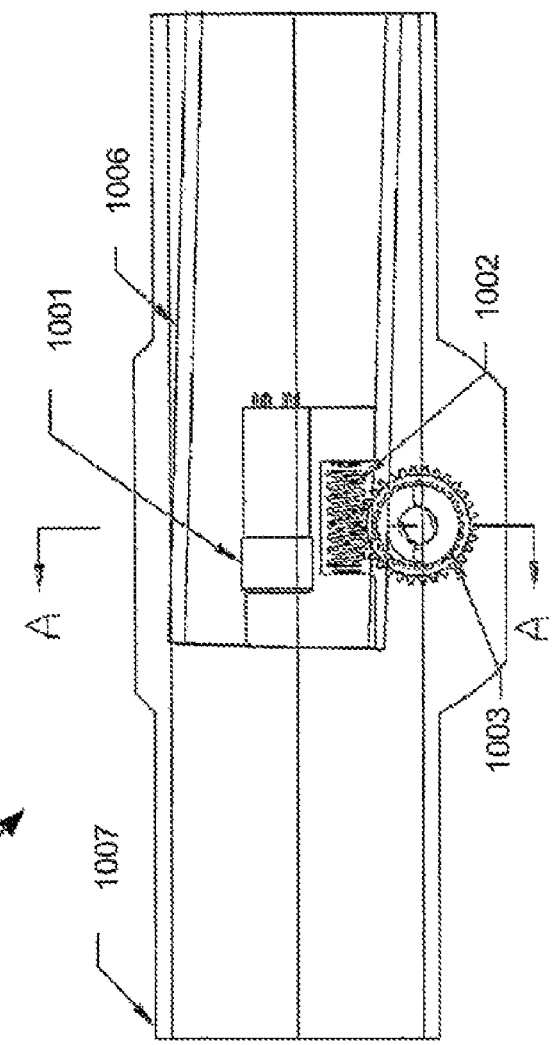

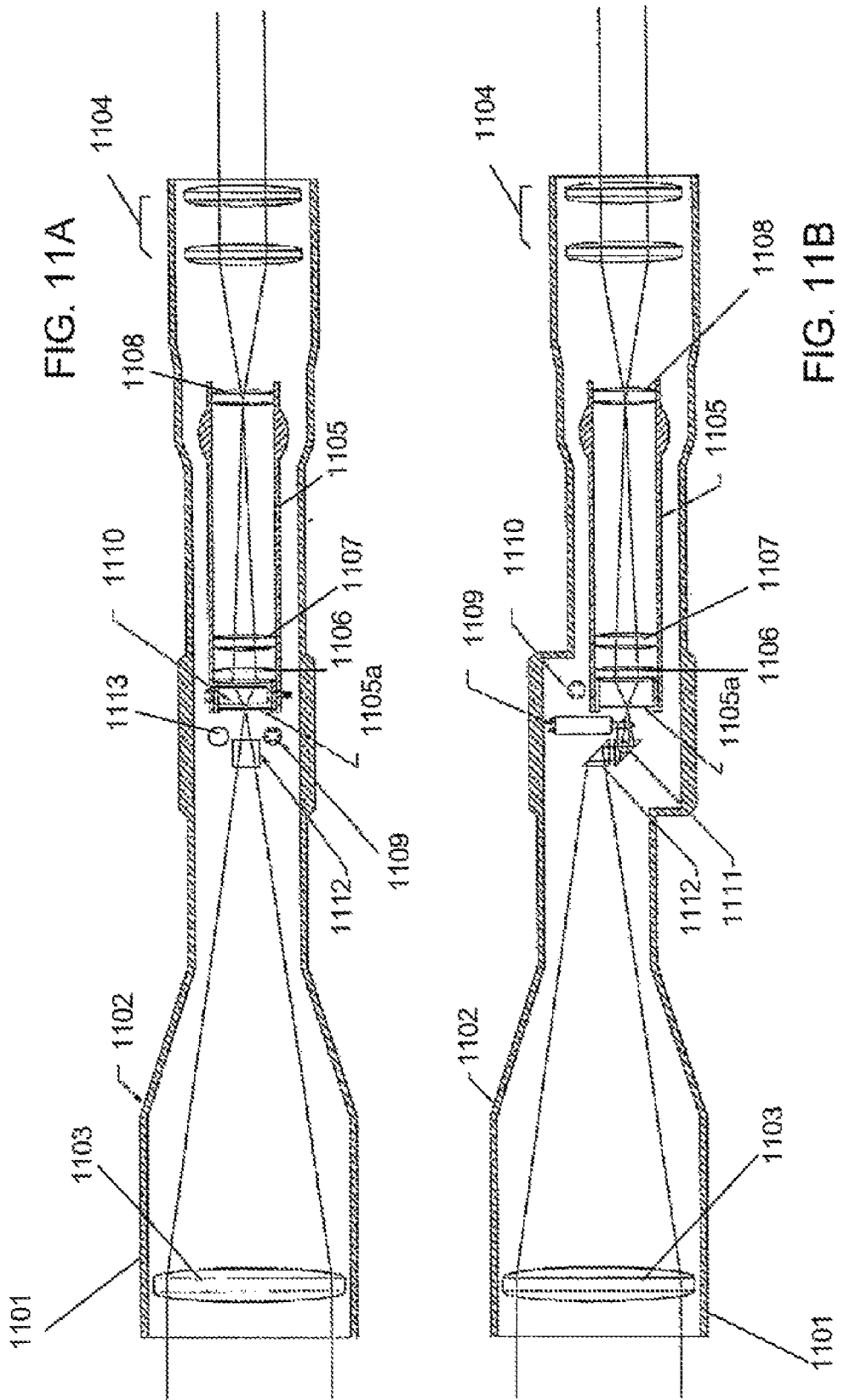

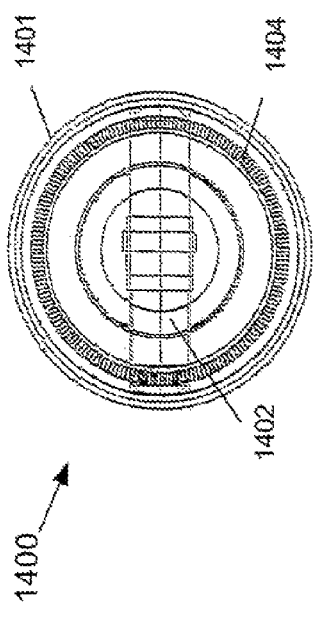
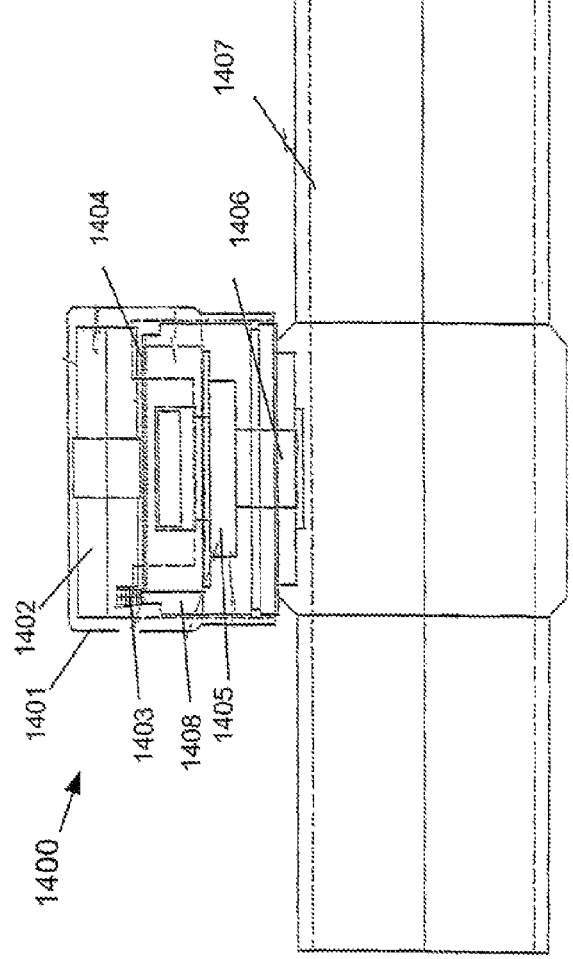

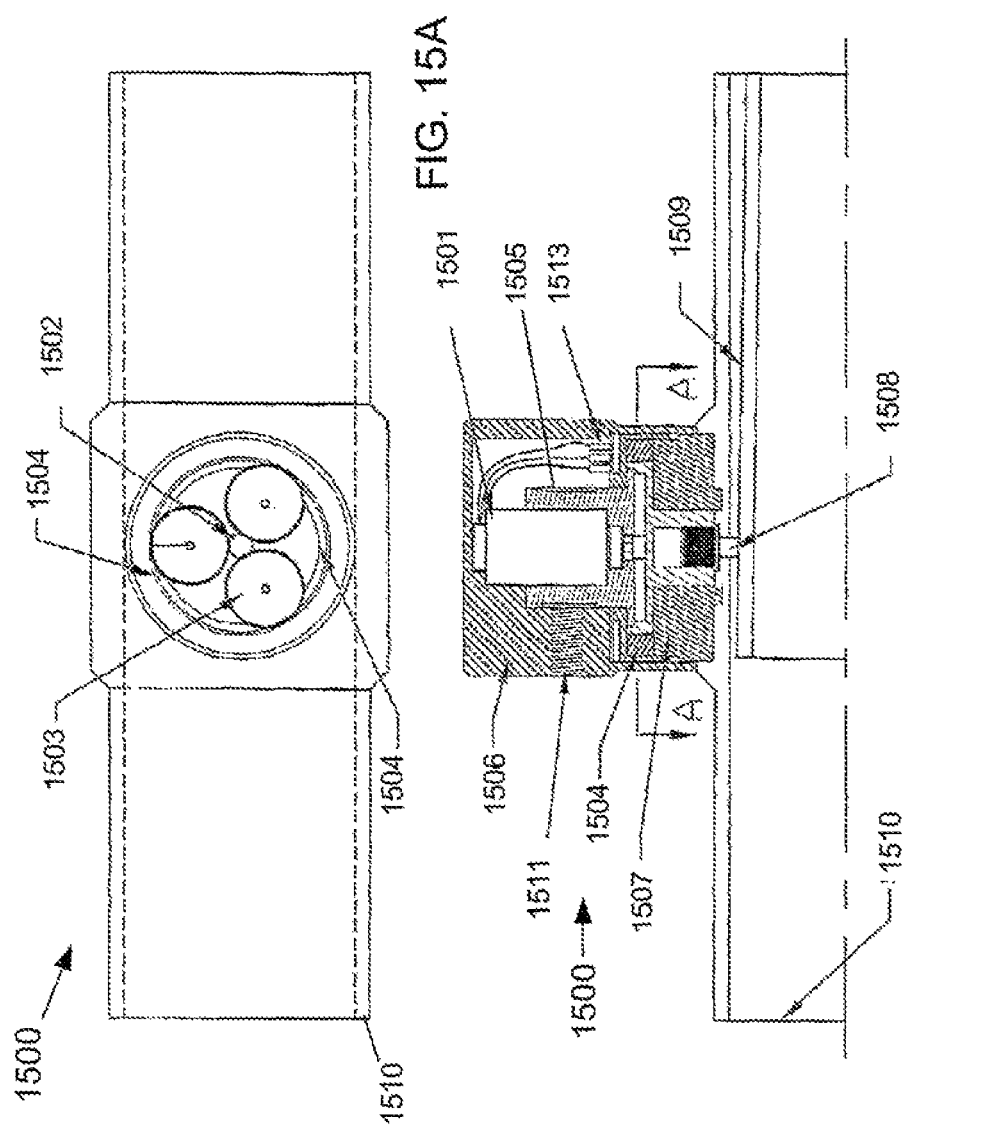

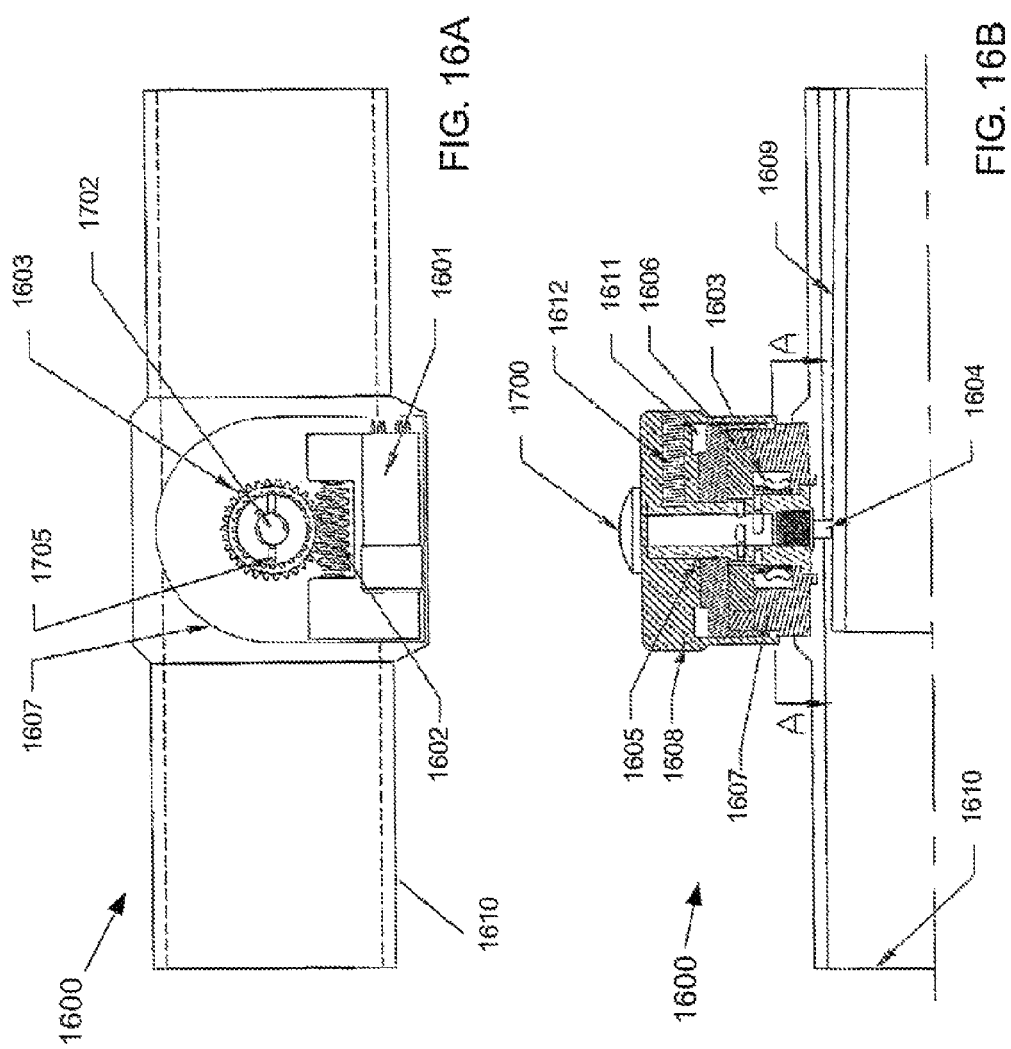

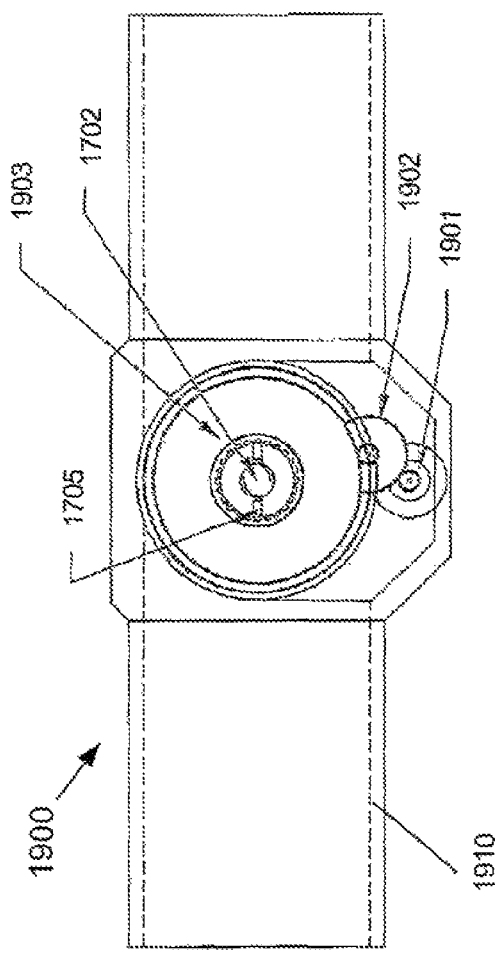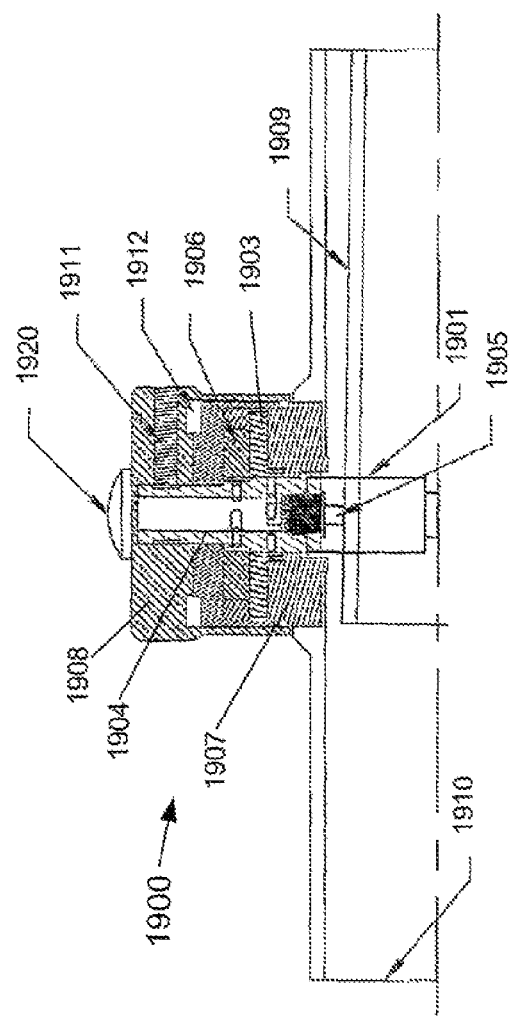

OPTICAL SIGHTING SYSTEM

CROSS-REFERENCE TO RELATED PATENT APPLICATIONS

The present patent application is a Continuation patent application of application Ser. No. 12/807,118, filed Aug. 27, 2010, entitled "Optical Sighting System," and invented by Bernard T. Windauer et al., which is a Continuation patent application of Ser. No. 11/720,426, filed May 29, 2007, entitled "Optical Sighting System," and invented by Bernard T. Windauer et al., now U.S. Pat. No. 7,806,331 B2 to Windauer et al., and the present patent application claims priority from U.S. Provisional Application Ser. No. 60/632,331, filed Nov. 30, 2004, U.S. Provisional Application Ser. No. 60/638,561, filed Dec. 22, 2004, and PCT Patent Application No. PCT/US05/43335, filed Nov. 30, 2005, the contents of each being hereby incorporated by reference herein.

BACKGROUND OF THE INVENTION

The present inventive concept relates to an automatic optical sighting system (AOSS) that may be used with an optical enhancement device, such as a telescopic sight for use with a civilian or military individual shoulder- or hand-fired firearm, or in any firearm classified as a line-of-sight or a "small arm" firearm that is on a mechanical mount for stability or portability.

FIG. 1 depicts a basic problem associated with aiming a firearm. Line of sight 110 of a shooter (also referred to herein as "marksman," "operator," or "user") from a firearm 111 to a target 112 essentially a straight line. The shooter aims firearm 111 by choosing a direction to point firearm 111 such that a projectile leaving firearm 111 hits target 112. Extended bore line 113 is a straight line projecting from the muzzle 114 of firearm 111, and is the straight line direction in which firearm 111 is aimed (or pointed). A projectile leaving firearm 111 travels in a curved trajectory 115, thereby deviating from the straight line path of extended bore line 113. Accordingly, a basic problem for a shooter is to choose the proper pointing orientation of firearm 111 so that a projectile leaving firearm 111 hits target 112, that is, selection of the proper angle of elevation of extended bore line 113, so that trajectory 115 followed by a projectile leaving firearm 111 ends at target 112.

To further complicate the basic problem, trajectory 115 may be affected by factors including gravity, distance to target ("range" herein), and weather conditions, such as atmospheric pressure, temperature, humidity and wind (i.e., ambient conditions), as well as other secondary factors discussed below. In order to hit target 112, a shooter must also adjust the orientation, or firing position, of firearm 111 to take into account each of the factors affecting trajectory 115.

Existing sighting systems for civilian, law enforcement, and military firearms that are used for adjusting the orientation of a firearm are limited by the training of the marksman to judge ambient conditions at the location and time when a shot is taken. Generally, a marksman must be very familiar with characteristics of the firearm, as well as ballistic performance characteristics of the ammunition under various conditions. Performance characteristics of the firearm and ammunition in ambient conditions at the time of firing are typically evaluated manually and processed mentally in order to determine sighting-system aiming point changes that the marksman deems necessary to produce the desired projectile point-of-impact. Further, due to variable target distances, atmospheric conditions and geographic conditions at the time of firing, a marksman must consider many variables in combination to determine the optimal sighting-system settings for hitting an intended target, thus presenting a difficult task. This is particularly true in military and law enforcement situations, but the same considerations also apply to hunters and target shooters in the civilian community.

Further difficulties in selecting a proper firing position are caused by secondary effects, such as Coriolis acceleration and Yaw of Repose deflection. Such secondary effects may have inconsequential effects on firing accuracy at shorter ranges, but can cause impact misses at long ranges. Recent developments in firearms and ammunition have made it possible to fire at targets that are very far (1000 meters or more) from a firing point, thereby increasing the importance of taking into account secondary effects for ballistic calculations. Additionally, in some military and law enforcement scenarios, range distances are shorter than 1000 meters, but targets appear very small, requiring secondary effects to be considered. Such stringent requirements for firing accuracy, in turn, place stringent requirements on a sighting system for mechanical and optical repeatability, accuracy, and computational algorithm precision and accuracy, which, in turn, places similarly stringent requirements on the collection accuracy of the corresponding raw data, such as range and ambient conditions.

The literature on firearms and projectile ballistics contains much information concerning accurately aiming a firearm. One automatic aiming system, in particular, is disclosed in U.S. Pat. No. 6,252,706 B1 to Kaladgew, the disclosure of which is hereby incorporated by reference.

According to Kaladgew, stepper motors situated external to the body of a telescopic sight are used for adjusting an automatic aiming system. A significant drawback, however, is that in-field use, a problem of stepper motor failure caused by dirt and moisture or mud build-up between the body of the scope and the body of the firearm can prevent a stepper motor from producing a desired adjustment. Further, the Kaladgew system provides no manual override in the event of battery failure, motor failure or system-controller failure.

Other drawbacks that are associated with the Kaladgew system include that Kaladgew does not disclose how windage adjustments are made, i.e., how the data is collected and processed, and how commands to a windage stepper motor are generated. Target distance is measured by Kaladgew using a laser rangefinder mounted on the firearm, although no other techniques are disclosed for measuring or incorporating target distance in calculations. Kaladgew also does not address incorporation of secondary factors when calculating telescopic sight adjustments, which, as discussed above, can play a significant role in long-distance target shooting, or in situations in which extreme precision is required. Specific factors not considered by Kaladgew include (1) gyroscopic (six-degrees-of-freedom) effects on bullet flight; (2) parallax corrections for a telescope sight; (3) altitude and atmospheric condition effects on projectile trajectory, (4) corrections for wind effects, especially vertical wind effects; and (5) Coriolis effects.

U.S. Pat. No. 6,813,025 B1 to Edwards, the disclosure of which is hereby incorporated by reference, discloses use of electronic adjustment motors that power movement of internal parts, but does not disclose any details of the mechanical interface between a motor and a corresponding adjuster that is to be adjusted on a telescopic sight. Edwards also provides telescopic sight adjustments through user-activated switches. By gathering data from an objective module that displays various data, a user may interpret the gathered data, and then activate one or more switches that are controlled by finger movements, which, in turn, cause telescopic sight adjustments to be made. Edwards provides no provision for automatic adjustment of telescopic sight adjustments through microprocessor system-initiated signals linked directly to adjustment motors. Additionally, Edwards provides no manual override for adjusting a telescopic sight in the event of electrical failure. Further, Edwards does not calculate or implement corrections for secondary effects (e.g., Coriolis Effect, gyroscopic effects) that may have significant impact on accuracy in long-range target situations.

Thus, a major drawback of both Kaladgew and Edwards is that neither automatically solves the equations of motion of a projectile from a muzzle to a target in near real time and, under all applicable conditions of firing, provides correct aiming adjustments to a sighting system based on the automatically solved equations to impact the target.

Another serious drawback of both Kaladgew and Edwards is that neither patent makes use of feedback information related to a state of at least one optical adjustment to either (1) enable the corresponding adjustor to accomplish a commanded adjustment quickly and accurately, or (2) confirm to the firearm operator that the commanded adjustment has been accomplished before firing the firearm.

Consequently, what is needed is a way to automatically solve the equations of motion of a projectile from a muzzle to a target in near real time and, under all applicable conditions of firing, provide correct aiming adjustments to a sighting system based on the automatically solved equations in order to impact the target. What is also needed is a system that utilizes feedback information related to a state of at least one optical adjustment to either (1) enable the corresponding adjustor to accomplish a commanded adjustment quickly and accurately, or (2) confirm to the firearm operator that the commanded adjustment has been accomplished before firing the firearm.

SUMMARY OF THE INVENTION

The present inventive concept automatically solves the equations of motion of a projectile from a muzzle to a target in near real time and, under all applicable conditions of firing, provides correct aiming adjustments to a sighting system based on the automatically solved equations in order to impact the target, all of which facilitate rapid aiming of the firearm under operational conditions in the field. The present inventive concept also provides a system that utilizes feedback information related to a state of at least one optical adjustment to either (1) enable the corresponding adjustor to accomplish a commanded adjustment quickly and accurately, or (2) confirm to the firearm operator that the commanded adjustment has been accomplished before firing the firearm.

Additionally, the present inventive concept provides an automatic optical sighting system that includes an adjustable optical system, at least one sensor and a processor. The adjustable optical system includes at least one optical adjustment. Each sensor detects a condition that affects a trajectory of a projectile between an origin and a selected target and generates an indication of the detected condition. At least one sensor is one of a crosswind sensor, a vertical wind sensor and a longitudinal wind sensor, a rangefinder, an inclination angle sensor, a temperature sensor, a barometer, a hygrometer, and a magnetic compass. The processor receives information related to each detected condition and information related to a state of at least one optical adjustment. The processor determines at least one adjustment for the adjustable optical system including at least one of an elevation adjustment, a windage adjustment, and a parallax adjustment based on at least one detected condition and the information related to the state of at least one optical adjustment so that the projectile will have a trajectory between the origin and the selected target that helps the projectile to hit the target. The processor further generates control signals that control each optical adjustment of the adjustable optical system. The processor can further determine at least one adjustment for the adjustable optical system that is based on a secondary factor that affects the trajectory of the projectile between the origin and the selected target, the secondary factor being related to one of a Coriolis effect and a gyroscopic effect. The processor can also further determine at least one adjustment for the adjustable optical system based on one of a three-degrees-of-freedom model, a modified three-degrees-of-freedom model or a six-degrees-of-freedom model of the projectile.

In one exemplary embodiment of the present inventive concept, the automatic optical sighting system further includes at least one actuator corresponding to each optical adjustment of the optical system such that each actuator is mechanically coupled to the corresponding optical adjustment, and an actuator controller corresponding to each actuator, such that each actuator controller controls the corresponding actuator in response to a corresponding control signal generated by the processor for the optical adjustment.

In another exemplary embodiment, at least one actuator can be manually overridden for making an optical adjustment to the optical system. In yet another exemplary embodiment, at least one optical adjustment of the optical system includes a coarse optical adjustment and a fine optical adjustment.

The present inventive concept also provides a method for automatically determining optical adjustments to an optical sighting system having at least one optical adjustment in which a condition indication signal is generated that is based on a detected condition that affects the trajectory of a projectile between an origin and a selected target, a state indication signal is generated based on a state of an optical adjustment of the optical sighting system, and at least one adjustment for the adjustable optical system is determined based on at least one condition indication signal and one state indication signal so that the projectile will have a trajectory between the origin and the selected target that helps the projectile to hit the target.

Further, the present inventive concept provides a computer-readable storage medium containing a set of machine-executable instruction for performing a method for automatically determining optical adjustments to an optical sighting system having at least one optical adjustment, such that the method includes receiving a condition indication signal based on a detected condition that affects the trajectory of a projectile between an origin and a selected target, receiving a state indication signal based on a state of an optical adjustment of the optical sighting system, and determining at least one adjustment for the adjustable optical system based on at least one received condition indication and at least one received state indication signal so that the projectile will have a trajectory between the origin and the selected target that helps the projectile to hit the target.

Yet another exemplary embodiment of an automatic optical sighting system includes an adjustable optical system, at least one sensor, a processor and a housing. The adjustable optical system has at least one optical adjustment. Each sensor detects a condition that affects a trajectory of a projectile between an origin and a selected target and generates an indication of the detected condition. At least one sensor is one of a crosswind sensor, a vertical wind sensor, a longitudinal wind sensor, a rangefinder, an inclination angle sensor, a temperature sensor, a barometer, a hygrometer, and a magnetic compass. The processor receives information related to each detected condition and determines at least one adjustment for the adjustable optical system based on at least one detected condition so that the projectile will have a trajectory between the origin and the selected target that helps the projectile to hit the target. The housing contains at least one actuator. The actuator corresponds to an optical adjustment of the optical system and is responsive to the determination of the processor by adjusting the optical adjustment based on the determination. The actuator is located internal to the housing. At least one actuator can be a stepper motor or a servo motor. Additionally, at least one actuator can be manually overridden for making an optical adjustment to the optical system. Further still, at least one optical adjustment of the optical system includes a coarse optical adjustment and a fine optical adjustment.

The present inventive concept also provides a method of manufacturing an automatic optical sighting system that includes providing an adjustable optical system having at least one optical adjustment, providing at least one sensor such that each sensor detects a condition that affects a trajectory of a projectile between an origin and a selected target and generates an indication of the detected condition, and providing a processor receiving information related to each detected condition and information related to a state of at least one optical adjustment, the processor determining at least one adjustment for the adjustable optical system based on at least one detected condition and the state of the at least one optical adjustment so that the projectile will have a trajectory between the origin and the selected target that helps the projectile to hit the target.

Still further, the present inventive concept provides a method of manufacturing an automatic optical sighting system that includes providing an adjustable optical system having at least one optical adjustment, providing at least one sensor such that each sensor detecting a condition that affects a trajectory of a projectile between an origin and a selected target and generating an indication of the detected condition, providing a processor and providing a housing. The processor receives information related to each detected condition and determines at least one adjustment for the adjustable optical system based on at least one detected condition so that the projectile will have a trajectory between the origin and the selected target that helps the projectile to hit the target. The housing contains at least one actuator. The actuator corresponds to an optical adjustment of the optical system and is responsive to the determination of the processor by adjusting the optical adjustment based on the determination. The actuator is located internal to the housing.

BRIEF DESCRIPTION OF THE DRAWINGS

The present invention is illustrated by way of example and not by limitation in the accompanying figures in which like reference numerals indicate similar elements and in which:

FIGS. 10A and 10B respectively depict top and side cutaway view of a third exemplary embodiment of an optical adjustment subsystem for an AOSS according to the present inventive concept;

FIGS. 11A and 11B respectively depict top and side cutaway view of a fourth exemplary embodiment of an optical adjustment subsystem for an AOSS according to the present inventive concept;

FIGS. 14A and 14B respectively show top and side cutaway views of a seventh exemplary embodiment of a direct-drive adjustor according to the present inventive concept;

FIGS. 15A and 15B respectively show top and side cutaway views of an eighth exemplary embodiment of an adjustor assembly according to the present inventive concept;

FIGS. 16A and 16B respectively show top and side cutaway views of a ninth exemplary embodiment of an adjustor assembly according to the present inventive concept;

FIGS. 19A and 19B respectively show top and side cutaway views of a ninth exemplary embodiment of an adjustor assembly according to the present inventive concept;

DETAILED DESCRIPTION OF THE INVENTION

The present inventive concept provides an automatic optical sighting system (AOSS). When used with a firearm, the AOSS of the present inventive concept automatically performs one or more aiming adjustments, thereby eliminating the need for a marksman to estimate the effects of, for example, range to the target, ambient weather conditions, direction of the target from the firearm, inclination angle of fire, and projectile characteristics. Additionally, exemplary embodiments of the present inventive concept provide automatic aiming adjustments that are necessary for compensating for one or more secondary effects that may affect accuracy of projectile impact at range distances in excess of about 800 meters, as well as accuracy of projectile impact for smaller targets at closer range distances. The exemplary embodiments of the present inventive concept also allow a manual override of one or more adjusters that adjust, for example, elevation, windage, or parallax, in the event of an electrical system failure, adjustment motor failure, and/or processor system failure. Representative embodiments of the present inventive concept are shown in FIGS. 2-21.

Figure 1:
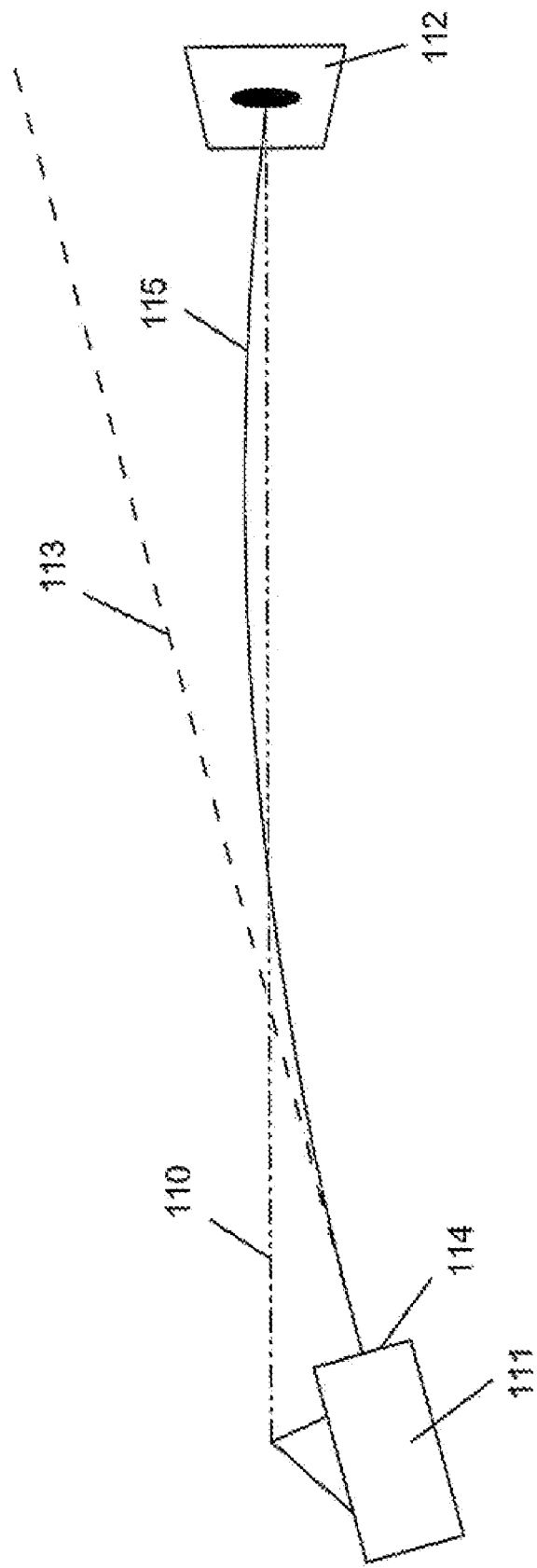
FIG. 1 depicts a basic problem associated with aiming a firearm.
Figure 2:
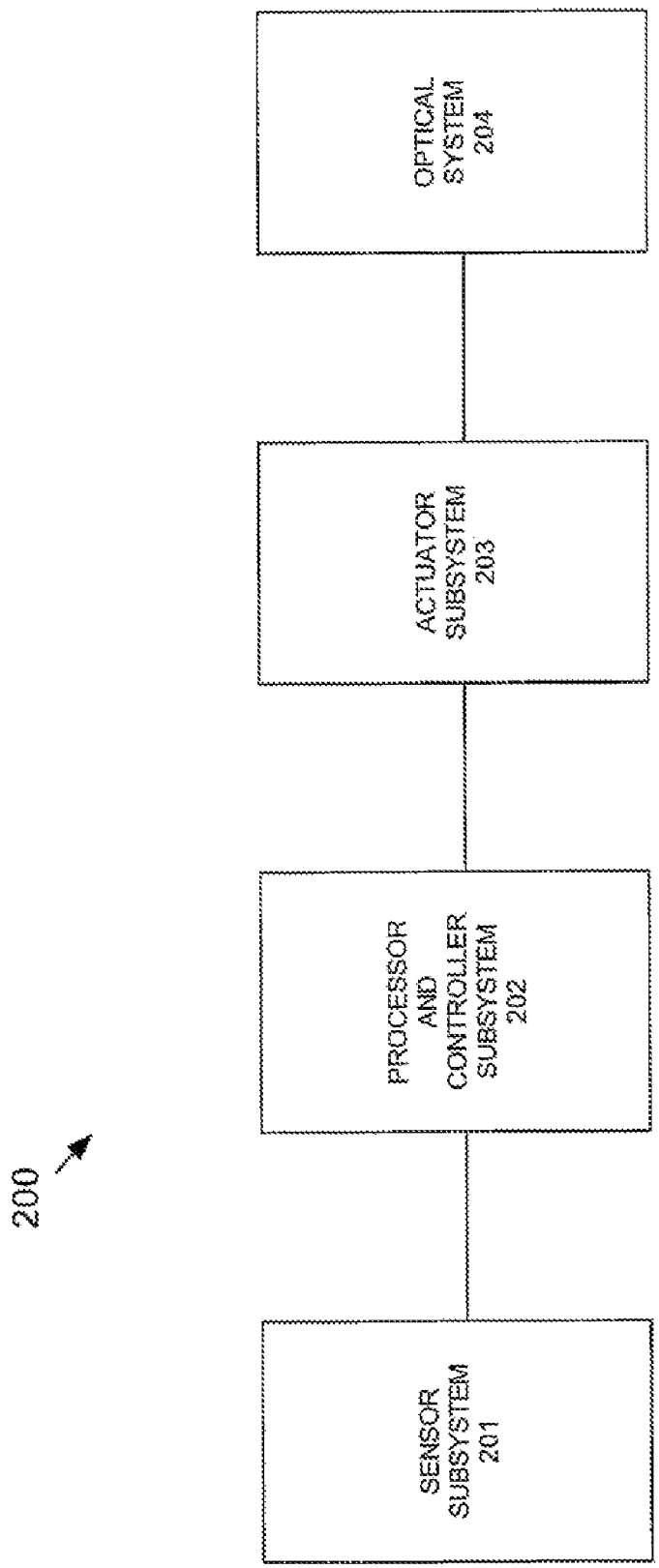
FIG. 2 shows an exemplary functional block diagram of an Automatic Optical Sighting System (AOSS) according to the present inventive concept.

FIG. 2 shows an exemplary functional block diagram of an Automatic Optical Sighting System (AOSS) 200 according to the present inventive concept. AOSS 200 is used by an operator, such as a marksman, prior to discharging a projectile through a firearm to automatically adjust optical adjustments of a sighting system that is associated with the firearm in order to hit an intended target. AOSS 200 includes a sensor subsystem 201, a processor and controller subsystem 202, an actuator subsystem 203 and an optical system, or (telescopic) sighting system, 204. In one exemplary embodiment, AOSS 200 can comprise a single unit containing all of the functional units shown in FIG. 2. In an alternative embodiment, selected functional subsystems can be located remotely, but typically in close proximity, from the other functional subsystems of the AOSS. As yet another alternative embodiment, selected portions of a functional subsystem or groups of functional subsystems can be remotely located from the rest of the functional subsystem and can be interconnected via hardwire, infrared (IR) or radio frequency (RF) signals. Display of measured, determined and/or calculated data on a separate functional subsystem(s) may be used for manual input to other subsystems and/or the AOSS system mounted on the firearm.

Sensor subsystem 201 includes sensors that detect the magnitude of physical parameters that affect the trajectory of a projectile, such as, but not limited to, the range and inclination angle of a target, weather conditions, such as ambient temperature, barometric pressure, humidity, wind speed and direction, firing direction, and geographic location. The term "sensor," as used herein, means a device that measures one or more physical quantities and produces an output signal that corresponds to the detected physical quantity. While sensor subsystem 201 is referred to herein as having a plurality of sensors, it should be understood that sensor subsystem can have as few as one sensor. The output of a sensor can accordingly be analog and/or a digital signal. The outputs of sensor subsystem 201 are coupled to the input of processor and controller subsystem 202.

Processor and controller subsystem 202 processes the output received from sensor subsystem 201 for determining adjustments that should be made to optical system 204 so that a projectile hits the intended point-of-impact at the target. Based on the determined adjustments, processor and controller subsystem 202 generates signals corresponding to the determined adjustments and output the signals to actuator system 203 and/or displays determined adjustment value results for manual input. In one exemplary embodiment, processor and controller subsystem 202 is a microprocessor-based system that includes memory and other peripheral-type devices that are necessary for the microprocessor-based system to receive data, store and execute machine-executable instructions, process data, and output signals and data corresponding to the processed data. For example, processor and controller subsystem 202 can include Random Access Memory (RAM), Read-Only Memory (ROM), input/output (I/O) devices such as, but not limited to, keyboard/keypads, thumbwheels, touch screens, data input ports, input and output signal conditioner devices, data display devices, and machine-executable instructions for processing data input to subsystem 202. In alternative embodiments, processor and controller subsystem 202 can be configured as one or more Application Specific Integrated Circuits (ASICs) and/or one or more state machines.

Actuator subsystem 203 converts the signals received from processor and controller subsystem 202 into mechanical motion for repositioning adjusters of optical system 204.

Optical system 204 includes optical elements, such as a telescopic sight, and associated components, such as focusing lenses, reticles, adjusters for adjusting optical adjustments, for example, elevation, crossrange (also referred to as "windage") and/or parallax of the telescopic sight.

Figure 3:
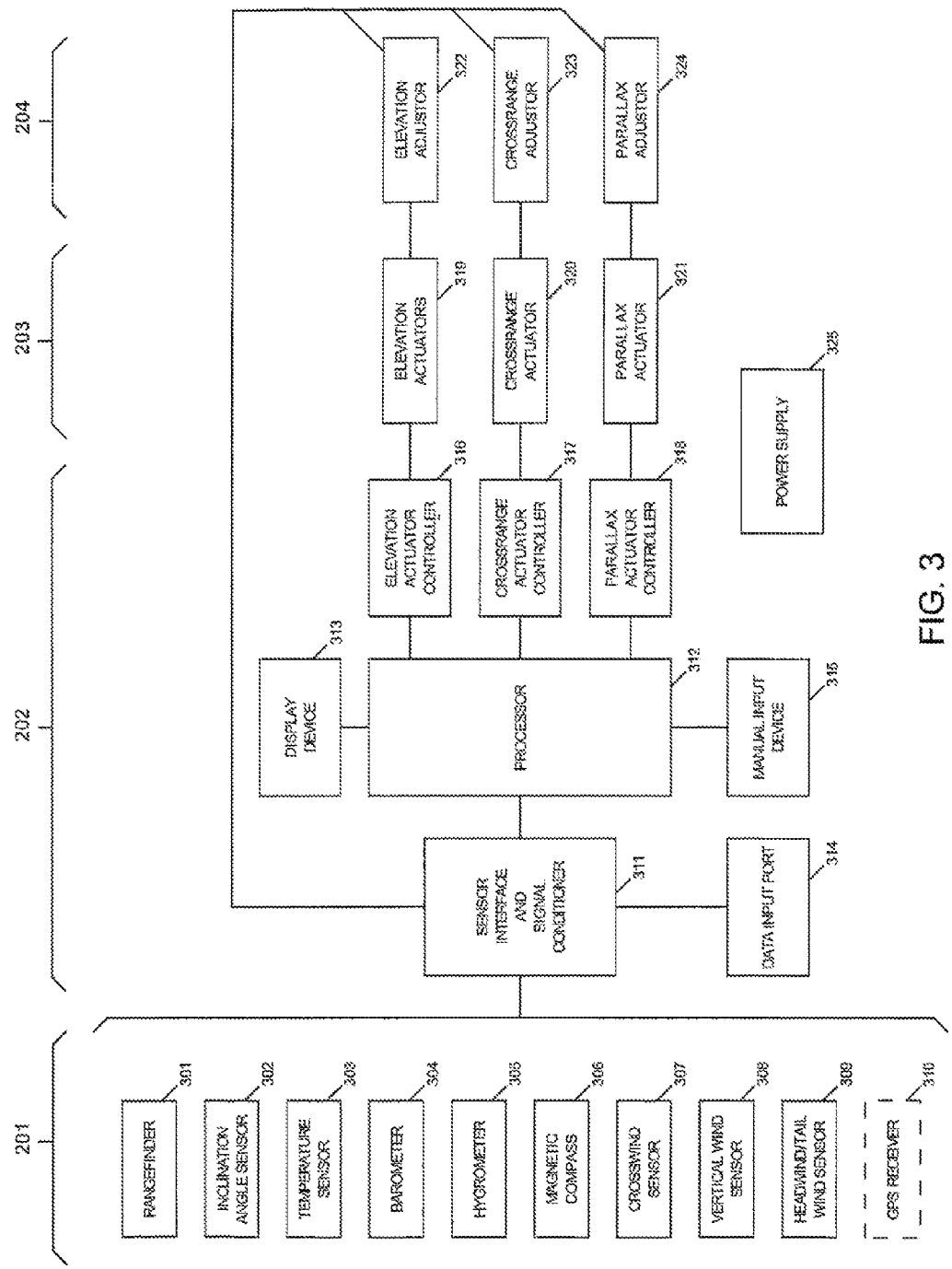
FIG. 3 is an exemplary functional block diagram showing AOSS 200 in greater detail.

FIG. 3 is an exemplary functional block diagram showing AOSS 200 in greater detail. In particular, sensor subsystem 201 includes a plurality of sensors 301-310. Processor and controller subsystem 202 includes a sensor interface and signal conditioner 311, a processor 312, a display device 313, a data input port 314, a manual input device 315, an elevation actuator controller 316, a crossrange actuator controller 317, and a parallax actuator controller 318. Actuator subsystem 203 includes an elevation actuator 319, a crossrange actuator 320 and a parallax actuator 321. Optical system 204 includes an elevation adjustor 322, a crossrange adjustor 323 and a parallax adjustor 324. Additional details regarding optical system 204 are not shown in FIG. 3.

Also shown in FIG. 3 is a power supply 325 that supplies power to components as needed in a well-known manner. Power supply 325 is typically a battery-powered subsystem that could be physically located in one location within AOSS 200 or, alternatively, be distributed throughout AOSS 200. When feasible and practical, the batteries within power supply 325 may be recharged by way of solar cells or chemical reactants, or from energy storage devices (e.g., capacitors) located either within or external to the AOSS. Additionally or alternatively, power supply 325 could couple AOSS 200 in a well-known manner to an available power supply that is associated with a mobile platform, such as a vehicle, a generator, or a power grid.

One exemplary embodiment of sensor subsystem 201 includes a rangefinder 301, an inclination angle sensor 302, a temperature sensor 303, a barometer 304, a hygrometer 305, a magnetic compass 306, a crosswind sensor 307, a vertical wind sensor 308, and a headwind/tailwind (longitudinal wind) sensor 309. Rangefinder 301 provides distance information relating to a target. Inclination angle sensor 302 provides angle of inclination information of the target with respect to a local level at the firing point of a firearm. Temperature sensor 303 provides information relating to the ambient temperature in the vicinity of AOSS 200. Barometer 304 provides information relating to the ambient atmospheric pressure in the vicinity of AOSS 200. Hygrometer 305 provides information relating the ambient humidity in the vicinity of AOSS 200. Magnetic compass 306 provides geographic point direction information based on the detected magnetic field of the earth. Crosswind sensor 307 provides cross, or horizontal, wind-speed information in the vicinity of AOSS 200. Vertical wind sensor 308 provides vertical wind-speed information in the vicinity of AOSS 200. Headwind/tailwind sensor 309 provides headwind/tailwind (longitudinal) speed information in the vicinity of AOSS 200.

Additionally, sensor subsystem 201 can include a global positioning system (GPS) receiver 310 for providing global position information for determining adjustments that must be made to optical subsystem 204. Details regarding use of a GPS receiver 310 are described further below.

Sensors 301-310 may be commercially available, or may be fabricated for a specific use or measurement, and output the respective measured quantities in either an analog or a digital form. An alternative embodiment of sensor system 201 could have more or fewer sensors.

Processor and controller subsystem 202 receives sensor signals output from sensor subsystem 201 and feedback signals from sensors associated with adjustors 322-324. Depending on the characteristics of a particular sensor output signal or a feedback signal, sensor interface and signal conditioner 311 may be used to buffer, convert, scale, level shift, etc., the output signal or feedback signal so that it is usable by processor 312 to automatically determine the adjustments that are necessary to the optical parameters of optical system 204 in order to hit a target. Additionally, sensor interface and signal conditioner 311 can convert the units of measure of a particular sensor output signal or feedback signal from one unit of measurement to another unit of measurement for use by processor 312.

More specifically, sensor interface and signal conditioner 311 provides a conditioning interface between sensor subsystem 201 and processor 312 and between sensors associated with adjustors 322-324 and processor 312 so that processor 312 can utilize the sensor signals. For example, when a sensor provides an analog output, sensor interface and signal conditioner 311 converts the analog signal to a digital signal in a well-known manner by providing an analog-to-digital converter (A/DC) function. When a sensor output can be used directly by processor 312, sensor interface and signal conditioner 311 may not be necessary except, perhaps, for a well-known signal buffering function. If necessary, sensor interface and signal conditioner 311 could also provide signal-scaling and level-shifting functions in a well-known manner, regardless whether the sensor signal is an analog or a digital signal.

Sensor interface and signal conditioner 311 could also provide an interface to receive sensor output signals that are transmitted to processor and controller subsystem 202 through a wired connection and/or a wireless connection such as an infrared (IR) signals or radio frequency (RF) signals. Thus, selected sensors of sensor system 201 could be remotely located from other functional subsystems and components of AOSS 200. For example, wind sensors 307-308 might be located in a remote position that better measures the wind parameters than if they were located in close proximity to the other components of AOSS 200. Output signals from the remotely located wind sensors could be transmitted to sensor interface and signal conditioner 311 using a wired link and/or a wireless link, such as an IR signal and/or an RF signal. Moreover, a sensor output signal could be specially configured to include, for example, frequency-hopping characteristics, so that it is not easily detected and its source located.

Processor 312 receives sensor output signals from sensor subsystem 201 and from sensors associated with adjustors 322-324 and automatically determines the adjustments that are necessary to the optical parameters of optical system 204 in order to hit the intended point-of-impact at the target based on the received sensor output signals. Processor 312 could be embodied as a microprocessor-based system that includes peripheral components, such as RAM and ROM memory and I/O devices. Alternatively, processor 312 could be embodied as a multi-processor-based system. As yet another alternative, processor 312 could be configured as a state machine. As still another alternative embodiment, processor 312 can be configured as a combination of a microprocessor-based system and a state machine.

When processor 312 is embodied as a microprocessor-based or a multi-processor-based system, processor 312 includes machine-executable instructions that are used in a well-known manner to automatically determine the adjustments that are necessary to the optical parameters of optical system 204. A descriptive outline of exemplary machine-executable instructions that can be executed by a microprocessor-based or multi-processor based system is provided elsewhere in this detailed description.

Additionally, a display device 313 can display selected information to a user. One exemplary embodiment of a suitable display device is a Liquid Crystal Display (LCD). Another exemplary embodiment of a suitable display device is a touch-screen LCD that can be used to receive data that is manually input by a user.

Data input port 314 provides an I/O interface for a manual input device, such as a keyboard, a keypad, a thumbwheel and/or a remote processing system. Data input port 314 can have wired and/or wireless functionality. As shown in FIG. 3, data input port 314 is coupled to sensor interface and signal conditioner 311 for conditioning received input signals and data for use by processor 312. When the input data received through data input port 314 can be used directly by processor 312, data input port 314 can be coupled directly to processor 312.

Processor 312 generates signals corresponding to the automatically determined adjustments and outputs the control signals to actuator controllers 316, 317 and 318 for controlling the optical adjustments of optical system 204 in order to hit a target. It should be understood that processor 312 could be remotely located from actuator controllers 316-318, or processor 312 and actuator controllers 316-318 are remotely located from actuators 319-321. Accordingly, control signals output from processor 312 and input to actuator controllers 316-318 and/or output from actuator controllers 316-318 and input to actuators 319-321 can be made over a wireline and/or wireless connection, such as an infrared (IR) connection and/or a radio frequency (RF) connection.

Processor 312 receives, for example, target range information, angle of incline from firearm to the target, ambient temperature, barometric pressure, relative humidity, geographic direction of target, cross wind magnitude, vertical wind magnitude, and longitudinal wind magnitude (headwind or tailwind) from sensor subsystem 201. Additional sensors may also provide input for other parameters that may affect projectile motion. Alternatively, output of range finder 301 may be read by the user through a visual display (not shown), and manually input by the user through a manual input device 315, such as a keyboard, a keypad, a thumbwheel and/or touchscreen display. Similarly, in an alternative embodiment, wind magnitude along each of the three axes (vertical, crossrange, longitudinal) may be estimated by a user and input to processor and controller subsystem 202 through a manual input device 315, such as a keyboard, a keypad, a thumbwheel and/or touchscreen display. Additionally, a user may input information relating to ballistic characteristics of the projectile through manual input device 315. For example, processor and controller subsystem may contain data tables so that a user only needs to input projectile identification information through manual input device 315.

Processor and controller subsystem 202 determines and generates control signals for controlling actuator subsystem 203, which, in turn, controls the elevation, cross range and/or parallax adjustments of optical subsystem 204. Processor and controller subsystem 202 also receives feedback signals from sensors associated with adjustors 322-324 that respectively indicate a position, or state, of an adjustor. Processor and controller subsystem 202 uses the feedback signals for determining whether actuators 319-321 have adjusted adjustors 322-324 in accordance with the adjustment control signals and for determining whether actuators 319-324 are properly responding to the adjustment control signals respectively output from controllers 316-318. When actuator subsystem 203 includes two-stage actuators, that is, coarse and fine adjustment actuators, processor and controller subsystem 202 generates appropriate signals for controlling both the coarse and fine adjustment actuators.

Figure 20:
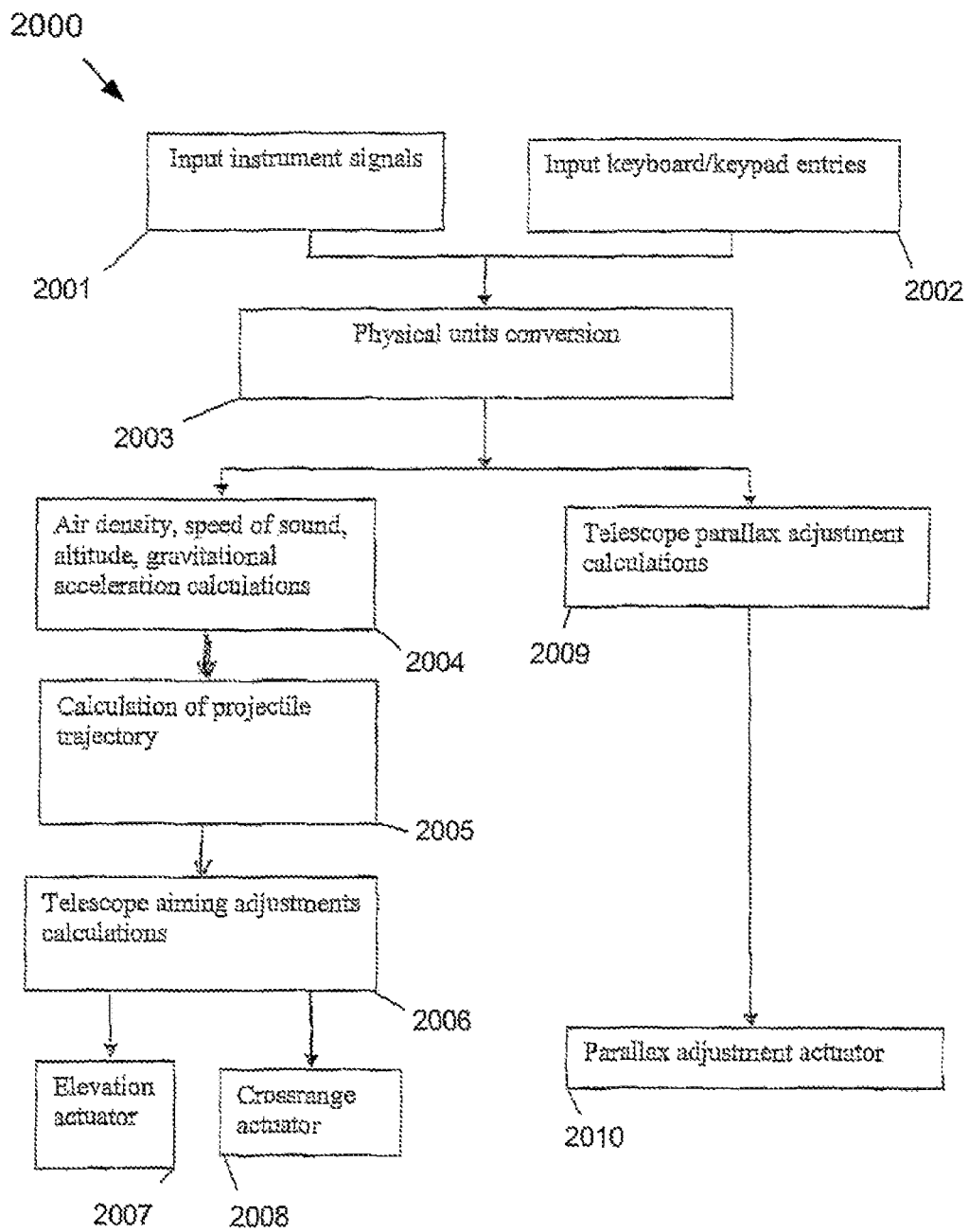
FIG. 20 shows an exemplary data and processing flow through an exemplary embodiment of an AOSS according to the present inventive concept.

FIG. 20 shows an exemplary data and processing flow 2000 through an exemplary embodiment of an AOSS according to the present inventive concept. With reference to FIGS. 2 and 3, detected sensor signals at 2001 and manually input data at 2002 in FIG. 20 are conditioned and converted, as necessary for a consistent set of units for trajectory determinations that are made by the AOSS. At 2004, such parameters as air density, speed of sound at firing location, and gravitational acceleration at the firing location are determined In order to determine these quantities, altitude may be determined based on the ambient temperature and barometric pressure measurements provided by sensor subsystem 201 at 2001. Alternatively, altitude of firing location may be manually entered at 2002 through, for example a manual input device 315 (FIG. 3). At 2005, the predicted projectile trajectory is determined from origin to target. In one exemplary embodiment, the predicted projectile trajectory is determined based on numerical integration of equations of motion of the projectile from its origin to the target. The determination may be carried out through use of any of following three dynamical models:

1. A three-degrees-of-freedom model in which a projectile is modeled as a point mass that is acted upon by aerodynamic drag and gravity, thereby yielding position components and velocity components along the projectile path. The three-degrees-of-freedom model typically gives accurate results for ranges of less than 1000 meters.
2. A modified three-degrees-of-freedom model in which a projectile is treated as a point mass with additional factors including Coriolis acceleration, and spin drift (also called Yaw of Repose drift).
3. A six-degrees-of-freedom model in which a projectile is modeled as both rotating and translating. This model is a highly complex analytical model, and yields precise estimates of translational and rotational position and velocity along the trajectory path.

For each of the dynamic models, wind conditions, air density, speed of sound and gravitational acceleration are determined at the instantaneous position of the projectile in flight.

After trajectory determination is complete, aiming adjustments for elevation actuator 319 and crossrange actuator 320 are determined at 2006. The AOSS determines deviation from a "home" position of the actuators that may be determined based on pre-mission test firing of the telescopic sight. Appropriate control signals are sent to elevation actuator 319 at 2007 and the crossrange actuator 320 at 2008.

At 2009, parallax adjustment is determined for nulling parallax for the target distance. At 2010, the parallax adjustment signal is sent to the parallax adjustment actuator 321. Parallax adjustment determination and adjustment can be performed simultaneously or sequentially with the determination for elevation and crossrange adjustments.

Figure 4:
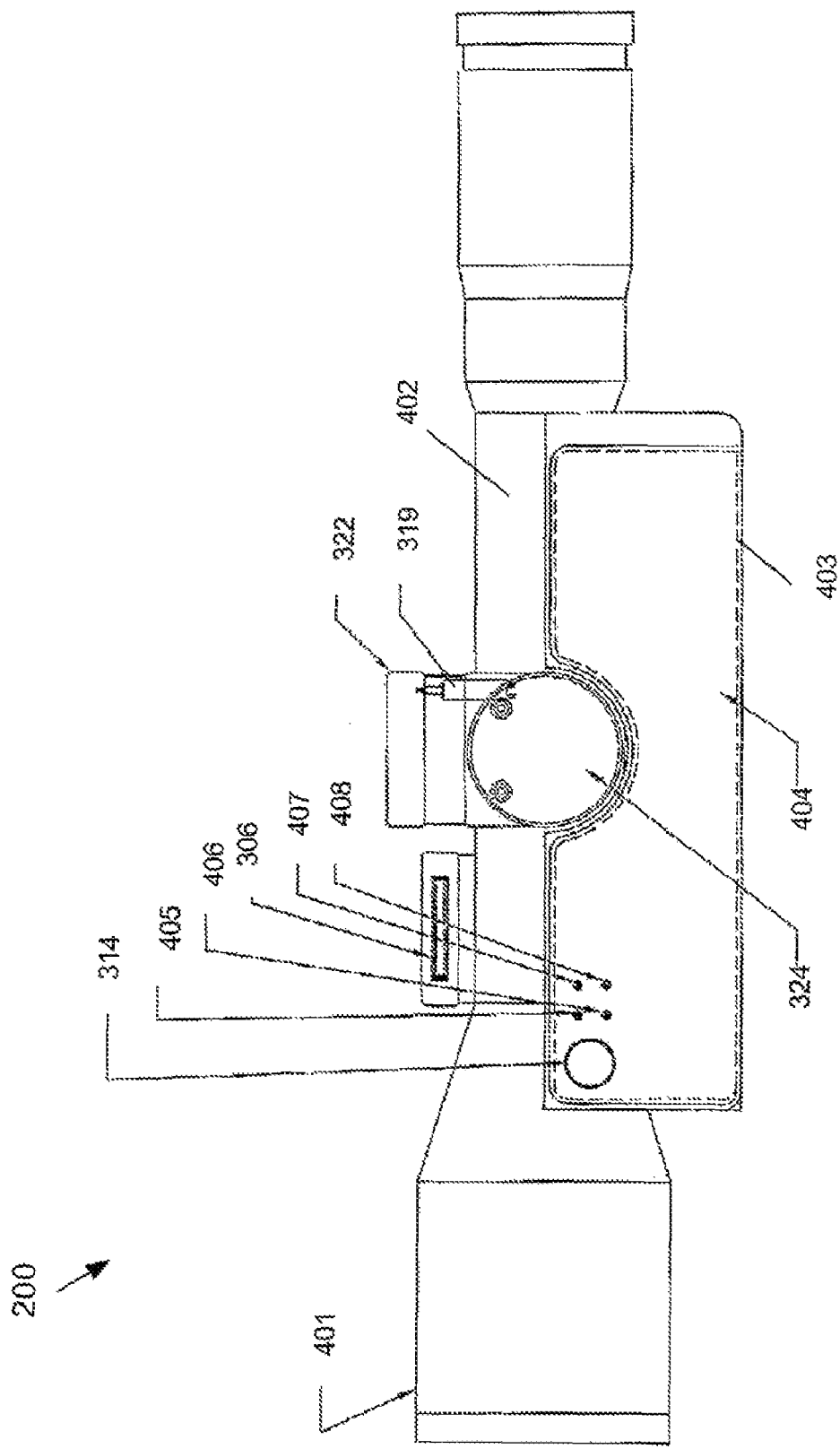
FIGS. 4 and 5 respectively depict a left-side view and a rear view of a first exemplary embodiment of an AOSS 200 according to the present inventive concept.
Figure 5:
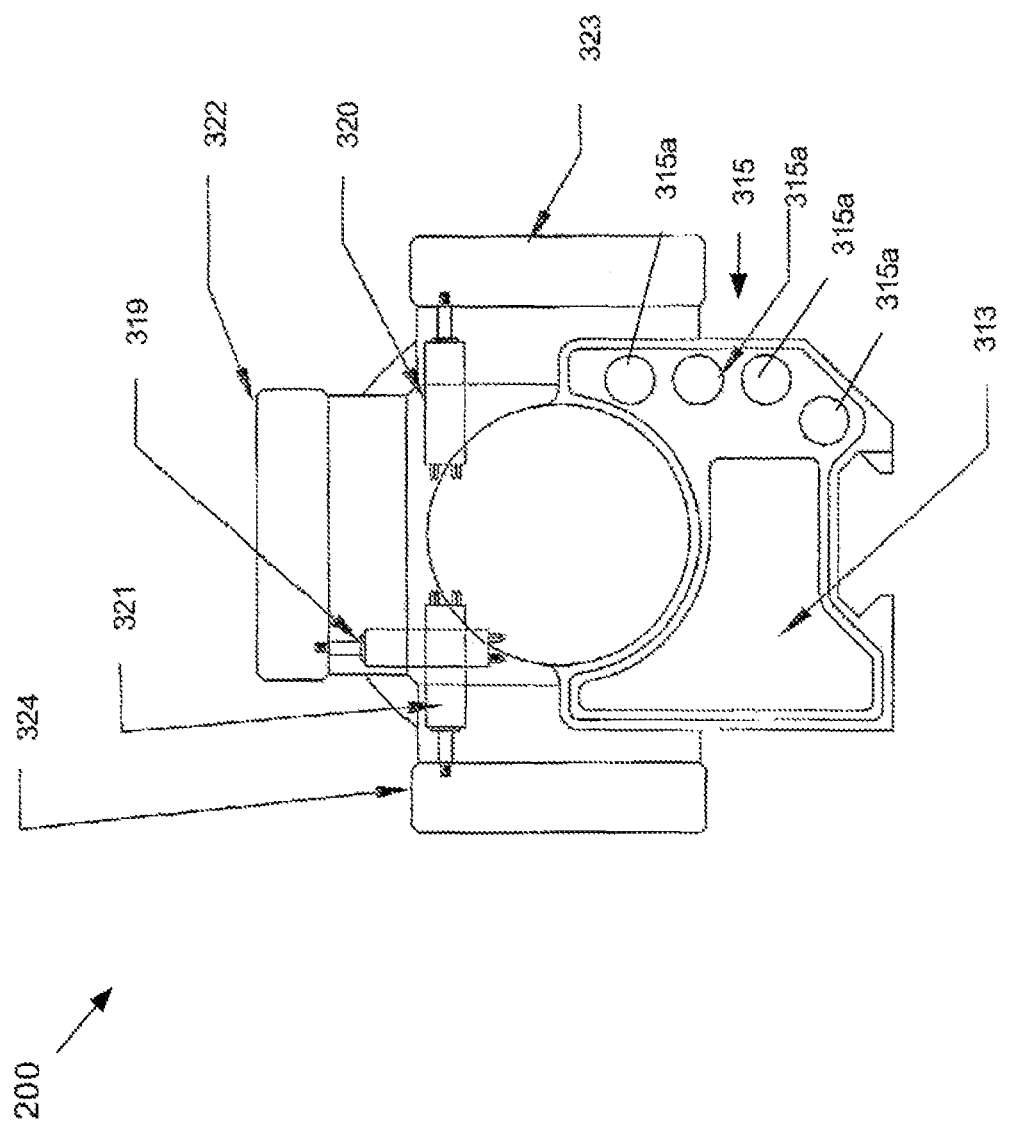

FIGS. 4 and 5 respectively depict a left-side view and a rear view of a first exemplary embodiment of AOSS 200 according to the present inventive concept. Optical system 204 of AOSS 200 includes a telescopic sight 401 with integral base assembly 403 that is typically mounted on a firearm (not shown in either FIG. 4 or 5). Telescopic sight 401 includes a sighting system body 402 that contains a lens system (not shown in either FIG. 4 or 5). The lens system includes an aiming point reticle that can be of any suitable configuration, such as a crosshair, or a dot, and can be illuminated or non-illuminated. Optical system 204 has an externally mounted vertical adjuster 322 for adjusting vertical (elevation) orientation of the reticle aiming point, an externally mounted crossrange adjuster 323 for adjusting lateral (windage) position, and an externally mounted parallax adjuster 324 for adjusting lens parallax. Adjusters 322, 323 and 324 are respectively rotated by actuators 319, 320 and 321. Actuators 319, 320 and 321 are shown in FIGS. 4 and 5 as being superimposed onto AOSS 200 to depict their respective exemplary physical relationship internal to AOSS 200 with respect to adjustors 322, 323 and 324. Each actuator 319, 320 and 321 is powered from power subsystem 325. In the event of an electrical failure, such as battery failure, processor system failure, or motor drive failure each of adjusters 322, 323 and 324 may be rotatably adjusted manually.

The exemplary embodiment of AOSS 200 shown in FIG. 4 includes a housing 403 that contains an internally located electronics area 404. Electronics area 404 can include all or a portion of the sensor subsystem 201 and/or the processing and controller subsystem 202 and/or the actuator subsystem 203. Housing 403 may also include data input port 314 and connector interfaces 405-408. As described above, data input port 314 provides an I/O interface for a manual input device, such as a keyboard, a keypad, a thumbwheel and/or a remote processing system. Data input port 314 accepts input from, e.g., a wired and/or wireless data channel associated with another device, such as another processor system, memory module, or other source. Connector interfaces 405-408 receive sensor signals for sensors that are remotely located from AOSS 200. Data may also be manually input through manual input device 315, which is depicted in FIG. 5 as a plurality of keys 315a. Alternatively, manual input device 315 could be a keypad, keyboard or touchscreen display. AOSS 200 may include a display device 313 (FIG. 5) that displays selected operational data, and may optionally have capability for inputting data, such as through a touchscreen functionality. Accordingly, the touchscreen functionality may be disabled by an operator to avoid inadvertent input of unintended commands and/or data. Also contained in electronics area 304 is processor circuitry (not shown) for algorithm computations, and actuator controller electronics (not shown) for driving and testing actuator functions. Such circuitry is well known to persons skilled in the art, and therefore not presented in detail herein.

Sensor subsystem 201, processor and controller subsystem 202, and power supply 325 in whole or in part may be remotely located. Processor determination results may be displayed on the remote subsystem 202 via display device 313 with actuator subsystem 203 signals transmitted to actuator subsystem 203 and optical subsystem 204 via hardwire, IR, or RF methods. Manual adjustments of optical subsystem 204 may also be made via elevation adjustment 322, windage adjustment 323, and parallax adjustment 324 with corresponding manual adjustments of embodiments depicted in FIGS. 17A, 17B, 18A, and 18B.

Operation of AOSS 200 is as follows. A marksman determines the mission-specific ammunition that will be used. The marksman then inputs (or e.g., retrieves from electronic memory or other storage) the ammunition characteristics and firing point location information into electronic memory of the processor and controller subsystem 202 (or selects the information from memory) typically through data input port 314, or alternatively manually inputs projectile flight data and/or ambient conditions through manual input device 315 and/or display device 313.

Before executing a mission, the marksman typically test fires the firearm to verify proper operation of the system over its designed operational range. To typically operate the system, the marksman determines the target range, typically via, e.g., optical or laser rangefinders. Alternatively the shooter may estimate the target distance. This information may be input through data input port 314, manual input device 315 and/or display device 313, or may be measured by AOSS rangefinder 301 and input directly from rangefinder 301. Just before the shot, the marksman depresses a "start" button (not shown) which may be part of manual input device 315 or can be located elsewhere. The start button signals the AOSS to either make measurements via sensor subsystem 201, use manually input information, or a combination of both and send the results to processor and controller subsystem 202.

Processor and controller subsystem 202 determines the adjustments to optical system 204 that are required for a proper ballistic flight path of the projectile based on the measured range and other sensor measurements. Upon completion of the adjustment determinations, processor and controller subsystem 202 outputs control signals that control actuators 319-321 and adjustors 322-324, thereby positioning the reticle aiming point and lenses at the proper orientation to direct the projectile to its intended point of impact at the target. The position of each of the actuators and/or adjusters may be verified by a respective optical/digital encoder (not shown), and the adjuster may be re-adjusted if necessary.

When the adjustment sequence is complete, a "green" light emitting diode (LED) (not shown) or other applicable indicating device may be illuminated to signal the marksman that the firing sequence may be initiated, i.e., a shot may be fired. After a shot is fired, a follow-up shot may be taken within a predetermined period of time programmed into the AOSS system memory, prior to automatic resetting of the AOSS system. Automatic resetting of the system returns adjusters for elevation, cross range, and parallax to their respective "home" positions, i.e., the positions prior to the AOSS system generated adjustment. Automatic resetting may be overridden via, for example, manual input device 315, if desired.

Figure 6:
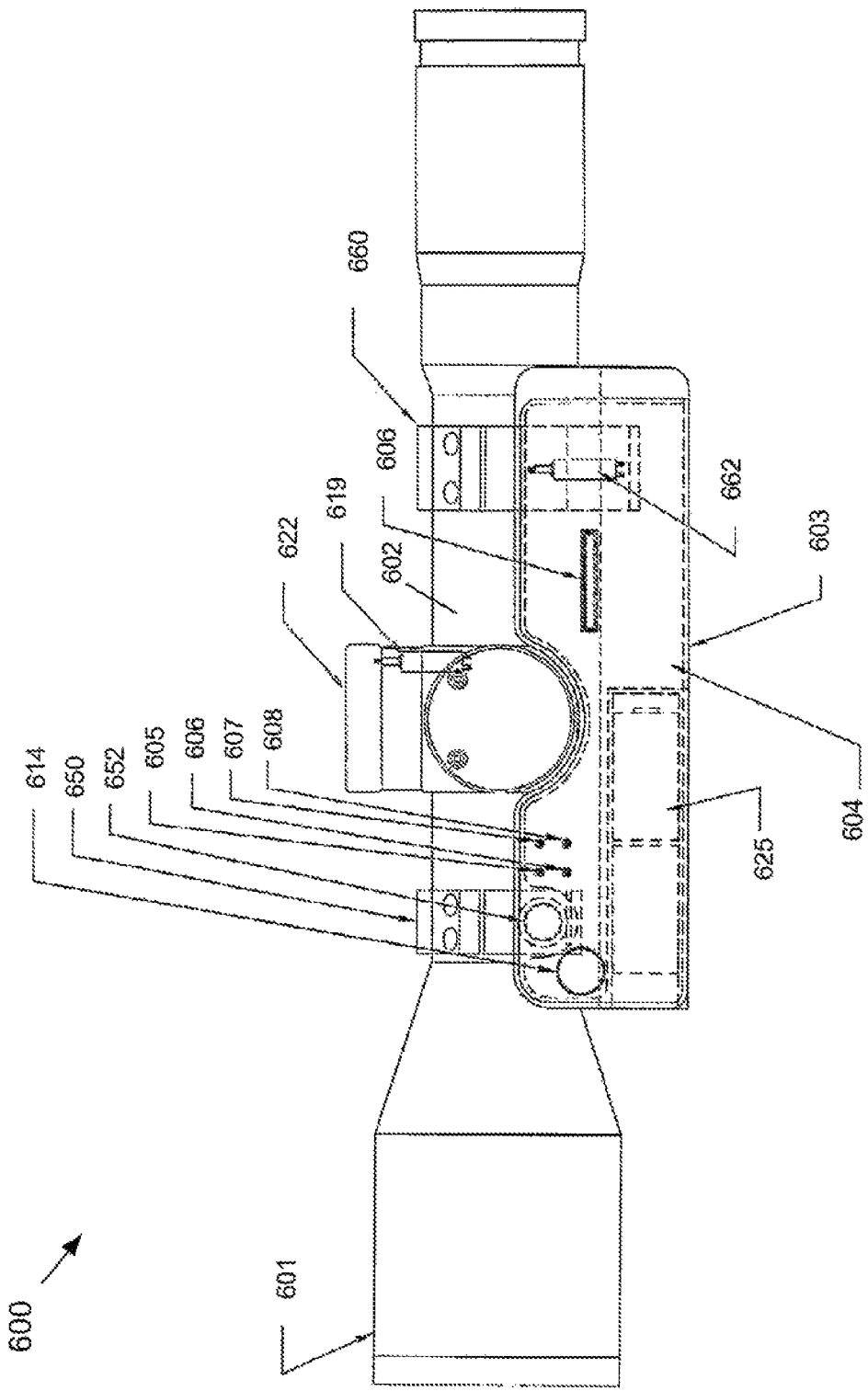
FIGS. 6 and 7 respectively depict a left-side view and rear view of a second exemplary embodiment of an AOSS according to the present inventive concept.
Figure 7:
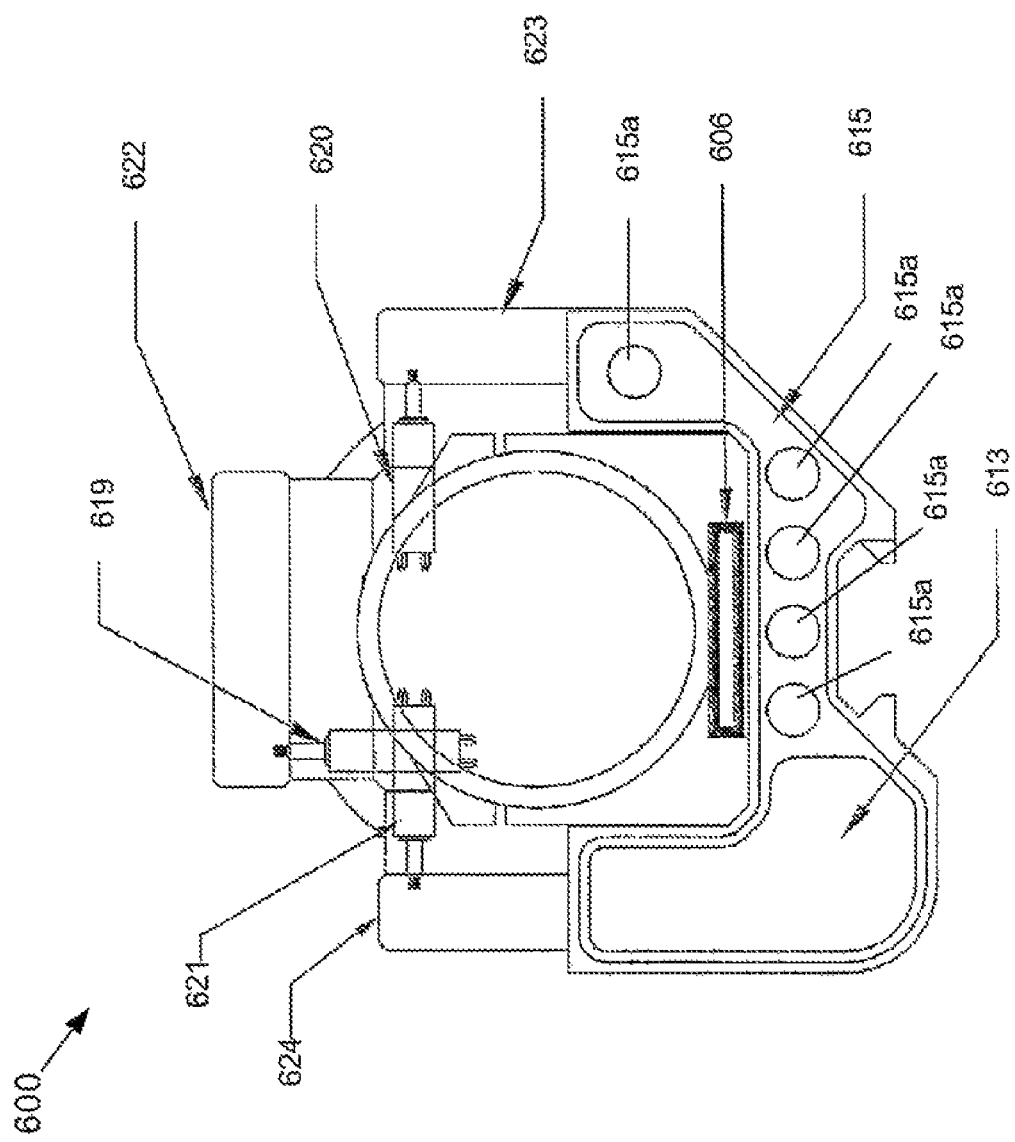

FIGS. 6 and 7 respectively depict a left-side view and a rear view of a second exemplary embodiment of an AOSS 600 according to the present inventive concept. FIGS. 2 and 3 depict functional block diagrams that correspond to the functionality of AOSS 600. The optical system of AOSS 600 includes a telescopic sight 601 that is typically mounted on a firearm (not shown in either FIG. 6 or 7). Telescopic sight 601 includes a sighting system body 602 that contains a lens system (not shown in either FIG. 6 or 7). The lens system includes an aiming point reticle that can be of any suitable configuration, such as a crosshair, or a dot, and can be illuminated or non-illuminated. The optical system of AOSS 600 includes an externally mounted vertical adjuster 622 for adjusting vertical (elevation) orientation of the firearm, an externally mounted crossrange adjuster 623 for adjusting lateral (crossrange) position, and an externally mounted parallax adjuster 624 for adjusting lens parallax. Adjusters 622, 623 and 624 are respectively rotated by actuators 619, 620 and 621. Actuators 619, 620 and 621 are shown in FIGS. 6 and 7 as being superimposed onto AOSS 600 to depict their respective exemplary physical relationship internal to AOSS 600 with respect to adjustors 622, 623 and 624. Each actuator is typically powered through a power supply subsystem 325. In the event of an electrical failure, e.g., battery failure, processor system failure, and/or motor drive failure, each of adjusters 622, 623 and 624 may be rotatably adjusted manually.

FIG. 6 shows that the exemplary embodiment of AOSS 600 includes a housing 603 that contains an internally located electronics area 604. Electronics area 604 can include all or a portion of processing and controller subsystem 202. Housing 603 also includes magnetic compass 606, data input port 614 and connector interfaces 605-608. Data input port 614 provides an I/O interface for a manual input device, such as a keyboard, a keypad, a thumbwheel and/or a remote processing system. Data input port 614 accepts input from, e.g., a wired and/or wireless data channel associated with another device, such as remotely located subsystems 201, 202, or both 201 and 202, or another processor system, memory module, or other source. Connector interfaces 605-608 receive sensor signals for sensors that are remotely located from AOSS 600. Data may also be manually input through manual input device 615, which is depicted in FIG. 7 as a plurality of keys 615a. Alternatively, manual input device 615 could be a keypad, keyboard or touchscreen display. AOSS 600 may include a display device 613 (FIG. 7) that displays selected operational data, and may optionally have capability for inputting data, such as through a touchscreen functionality. The touch screen functionality may be disabled by an operator to avoid inadvertent input of unintended commands and/or data. Also contained in electronics area 604 may be processor circuitry (not shown) for algorithm computations and determinations, and/or actuator controller electronics (not shown) for driving and testing actuator functions. Such circuitry is well known to persons skilled in the art, and therefore not presented in detail herein. An internal battery 625 or remotely located power supply subsystem, such as a battery system containing rechargeable or non-rechargeable batteries, powers AOSS 600, including actuators 622-624.

The front portion of the optical sight 601 is mounted in a pivot ring assembly 650 with horizontal trunnion pins (left trunnion pin 652 is shown in FIG. 6), which allows rotation of the optical sight 601 about a horizontal axis. The rear portion of the optical sight 601 is mounted on a multi-step ring assembly 660, which can elevate or depress the rear portion of the optical sight 601, the adjustment made through actuator 662. Adjustment of multistep ring assembly 660 results in a coarse adjustment of elevation of the optical sight 601 to keep the target image within the optical axis of the lens system. Fine adjustment can then be accomplished through control of the elevation adjuster 622, so that the reticle aiming point corresponds with the determined position based on processor and controller subsystem 202 output.

The mechanisms depicted in FIGS. 8 and 9 depict top and side cut-away views of an optical adjustment subsystem termed "Multistep Ring Assembly" for the second AOSS embodiment according to the present inventive concept. The mechanisms depicted in FIGS. 8 and 9 are used together to make a complete Multi-Step Ring Assembly.

Figures 8A, 8B:
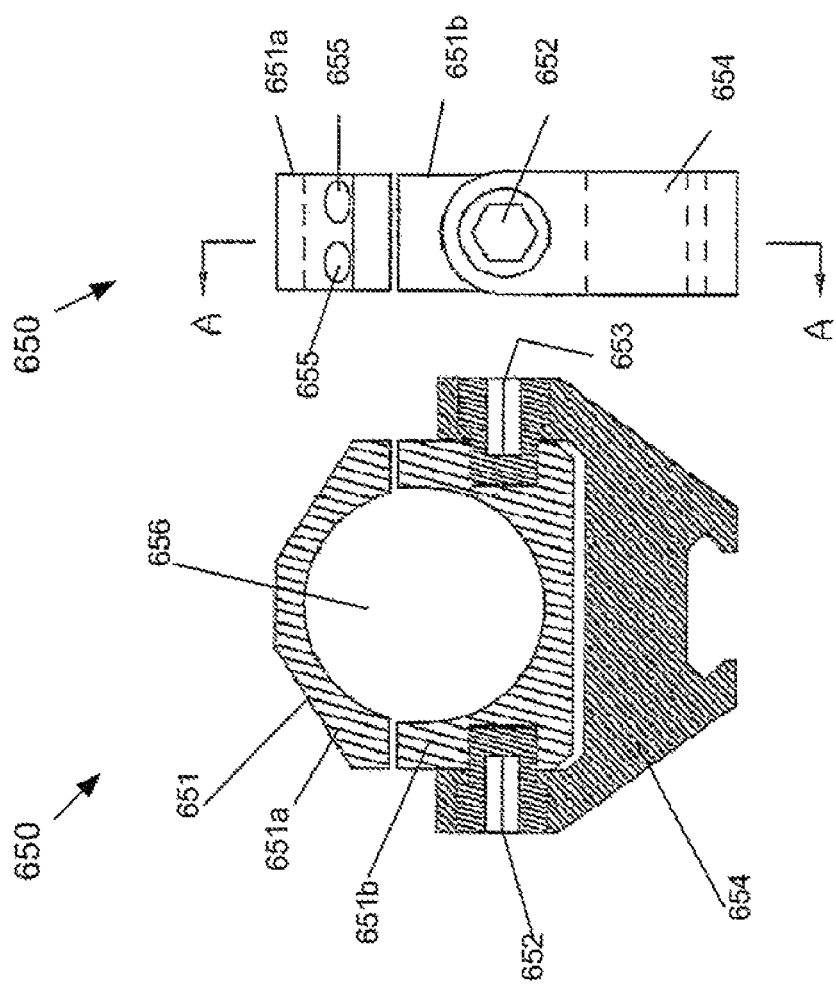
FIGS. 8A and 8B respectively depict cross-sectional and side views of an exemplary embodiment of an optical adjustment subsystem for the AOSS shown in FIGS. 6 and 7 according to the present inventive concept.

FIG. 8A shows a cross-sectional view of an exemplary embodiment of pivot ring assembly 650. FIG. 8B shows a side view of the exemplary embodiment of pivot ring assembly 650 shown in FIG. 8A. The cross-sectional view of FIG. 8A is taken along line A-A in FIG. 8B. Pivot ring assembly 650 includes a ring clamp 651, trunnion pins 652 and 653, and base bracket 654. Ring clamp 651 is formed by a top portion 651a and a bottom portion 651b (FIG. 8A) that are held together by screws (not shown) passing through screw holes 655. Ring clamp 651 encircles and holds sighting system body 602 (not shown in FIGS. 8A and 8B) in an aperture 656. Trunnion pins 652 and 653 pivotally hold ring clamp 651 to base bracket 654, thereby allowing ring clamp 651 to pivot around an axis passing through trunnion pins 652 and 653. Base bracket 654 is fixedly attached to a firearm (not shown) in a well-known manner.

Figures 9A, 9B:
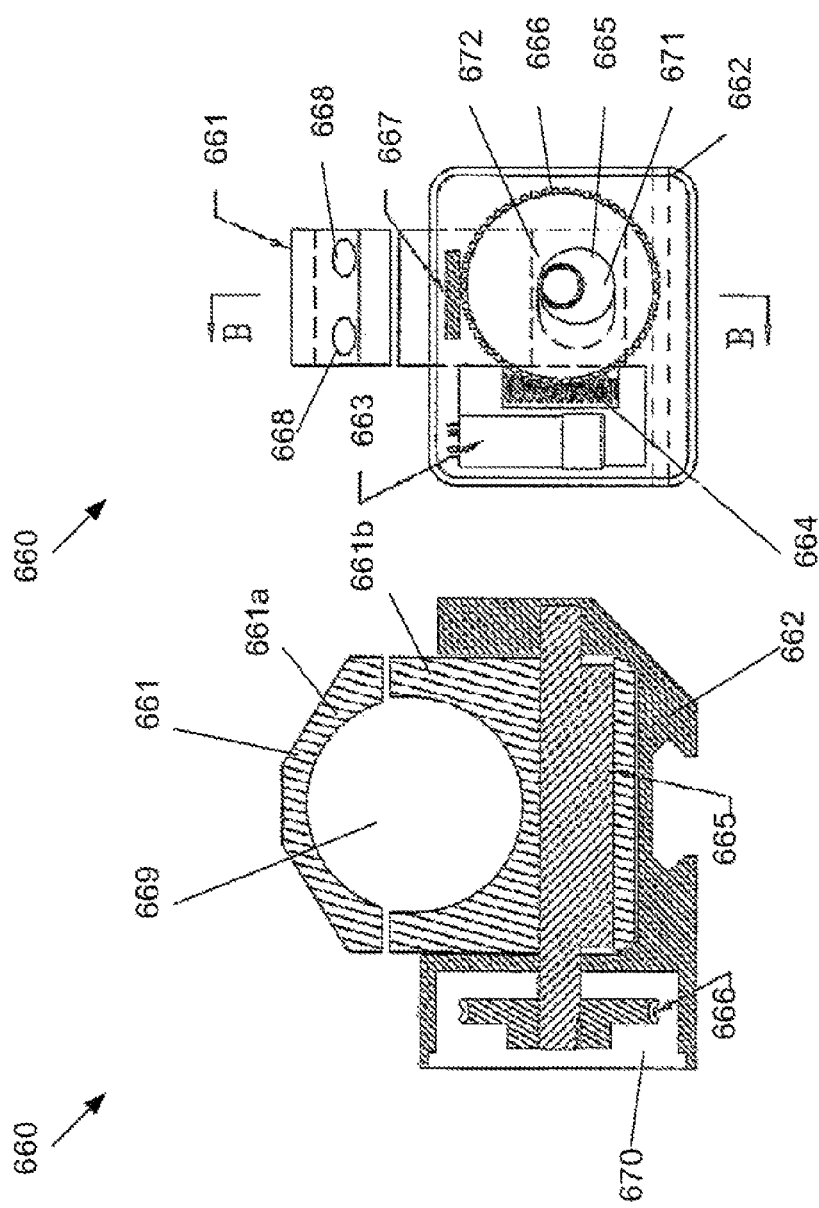
FIGS. 9A and 9B respectively depict cross-sectional and side views of an exemplary embodiment of an optical adjustment subsystem for the AOSS shown in FIGS. 6 and 7 according to the present inventive concept.

FIG. 9A shows a cross-sectional view of an exemplary embodiment of multi-step ring assembly 660. FIG. 9B shows a side view of the exemplary embodiment of multi-step ring assembly 660 shown in FIG. 9A. The cross-sectional view of FIG. 9A is taken along line A-A in FIG. 9B. Multi-step ring assembly 660 includes a lifting cam ring 661, a ring base 662, a coarse adjustment actuator 663, a worm gear 664, an eccentric cam 665, an eccentric cam gear 666, and a position sensor 667. Lifting cam ring 661 is formed by a top portion 661a and a bottom portion 661b (FIG. 9B) that are held together by screws (not shown) passing through screw holes 668. Lifting cam ring 661 encircles and holds sighting system body 602 (not shown in FIGS. 9A and 9B) in an aperture 669. Ring base 662 is fixedly attached to a firearm (not shown) in a well-known manner. Ring base 662 includes a cavity 670 that holds coarse adjustment actuator 663, worm gear 664, eccentric cam 665, eccentric cam gear 666, and position sensor 667. The cam portion of eccentric cam 665 passes through an aperture 671 in bottom portion 661b of lifting cam ring 661. Coarse adjustment actuator 663 drives worm gear 664. Worm gear 664, in turn, drives eccentric cam gear 666, thereby driving eccentric cam 665. As eccentric cam 665 is driven, lifting cam ring 661 is driven in a vertical direction (up or down) by contacting surface 672 in aperture 671. Position sensor 667 detects the position of eccentric cam 665 and generates a signal that can be used by AOSS 600 and/or displayed on display 613. In an alternative embodiment, position sensor 667 can be omitted.

When a coarse vertical adjustment is needed to place a target image within optical parameters of the lens system so that the target is visible by the shooter looking into the scope, coarse adjustment actuator 663 rotates worm gear 664 that rotates eccentric cam 665, lifting or depressing the cam ring 661 and the fixedly attached sighting system.

FIGS. 10A and 10B respectively depict top and side cutaway view of a third exemplary embodiment of an optical adjustment subsystem 1000 for an AOSS according to the present inventive concept. FIG. 10A is a cross-sectional view of optical adjustment subsystem 1000 taken along line A-A in FIG. 10B. Only one axis of adjustment is shown for clarity. Optical adjustment subsystem 1000 includes an actuator 1001, a worm gear 1002, a worm driven eccentric cam gear 1003, an adjusting cam 1004, and a spring member 1005. Actuator 1001 engages worm gear 1002, which, in turn, engages worm driven eccentric cam gear 1003. Worm driven eccentric cam gear 1003 is mechanically coupled to eccentric cam 1004. Actuator 1001 rotates worm gear 1002 in a selected direction in response to signals received from an AOSS. Worm gear 1002 drives worm driven eccentric cam gear 1003, which, in turn, rotates eccentric cam 1004, thereby adjusting the position of a reticle and lens housing 1006 within a sighting system body 1007. Spring member 1005, which can be a leaf-type spring or a coil spring, is positioned on the opposite of reticle and lens housing 1006 from adjusting cam 1004. Spring member 1005 applies a resistive force against reticle and lens housing 1006 that opposes the adjusting force that adjusting cam 1004 applies to reticle and lens housing 1006 to keep the reticle and lens housing 1006 against the cam surface.

Optical adjustment subsystem 1000 also includes an automatic/manual selection knob 1008, an index ring 1009 and a spring-loaded ratchet 1010. Automatic selection knob 1008 allows a user to select whether the rotational position of optical adjustment subsystem 1000 is automatically controlled by an AOSS, or manually controlled in the event of, for example, power failure, actuator failure, and/or motor system failure. Index ring 1009 is mechanically coupled to adjusting cam 1004. Automatic/manual selection knob 1008 is mechanically coupled via locking pins to spring-loaded ratchet 1010 and eccentric cam gear 1003 as shown in either FIG. 17 or 18. Index ring 1009 visually indicates a rotational position of the eccentric cam 1004 of the optical adjustment subsystem 1000.

The position of adjusting cam 1004 can be detected by a sensor 1011 in a well-known manner and a signal corresponding to the detected position can be output for use by an AOSS according to the present inventive concept as feedback sensing and/or display to an operator.

FIGS. 11A and 11B respectively depict top and side cutaway view of a fourth exemplary embodiment of an optical adjustment subsystem for an AOSS according to the present inventive concept, referred to as a "Moving Prism" optical adjustment mechanism. FIGS. 11A and 11B show a telescopic sighting system 1101 having sighting system body 1102 containing a front lens assembly 1103, a rear lens assembly 1104, and a reticle tube 1105. Reticle tube 1105 includes reticle 105a, lenses 1106, 1107 and 1108. The optical adjustment subsystem includes a vertical-adjustment actuator 1109, a reticle tube horizontal-adjustment actuator 1110, a moving prism 1111, a fixed prism 1112, and reticle tube vertical actuator 1113. Actuators 1109, 1110, and 1113 include a well-known planetary gear reduction and lead screw mechanism that is used for adjusting moving prism 1111, and reticle tube 1105. Vertical-adjustment actuator 1109 is considered a coarse adjuster to keep the target image within the optical axis of the lens system and moves moving prism 1111 vertically so that a target image is raised or lowered as viewed by an operator. Reticle tube horizontal-adjustment actuator 1110 and reticle tube vertical actuator 1113 are considered fine adjustment actuators and adjust the front of the reticle tube 1105 either horizontally or vertically so that the reticle aiming point corresponds with the calculated position adjustments made by electronic subsystems 201 and 202. The vertical position of moving prism 1111 and the horizontal and vertical position of the front of reticle tube 1105 can be detected by a position sensor (not shown) in a well-known manner and a signal corresponding to the detected positions can be output for use by the AOSS according to the present inventive concept as feedback sensing and/or display to an operator. Additionally or alternatively, the position of reticle tube 1105 can be detected by a position sensor (not shown) and provided to the AOSS according to the present inventive concept. If deemed necessary, horizontal positioning of the prisms 1111 and 1112 can be incorporated in a like manner as already described. An alternative exemplary embodiment provides only one adjustment actuator.

Figure 12A:
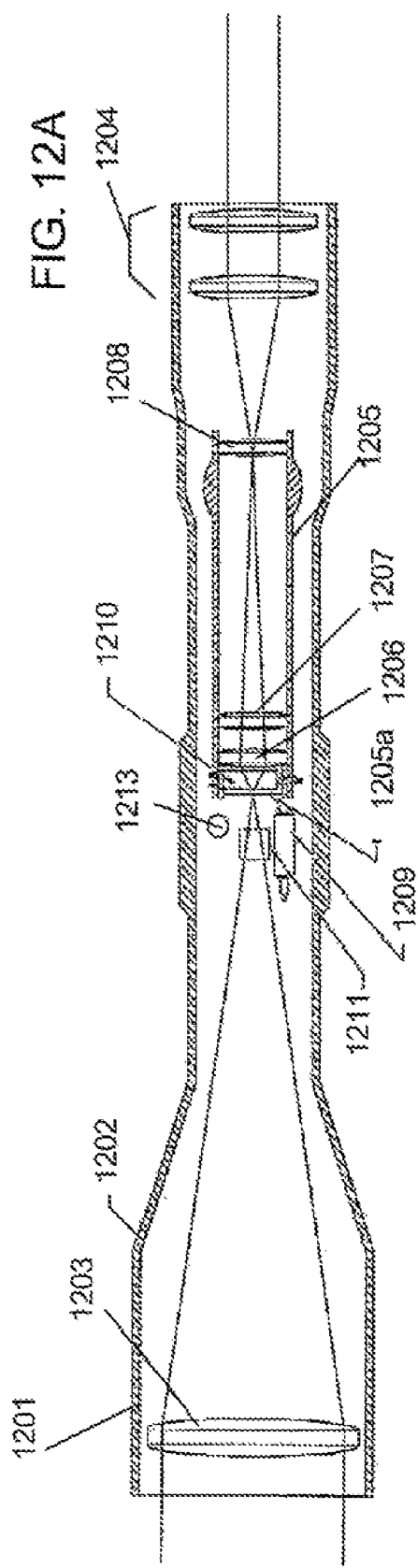
FIGS. 12A and 12B respectively depict top and side cutaway view of a fifth exemplary embodiment of an optical adjustment subsystem for an AOSS according to the present inventive concept.
Figure 12B:
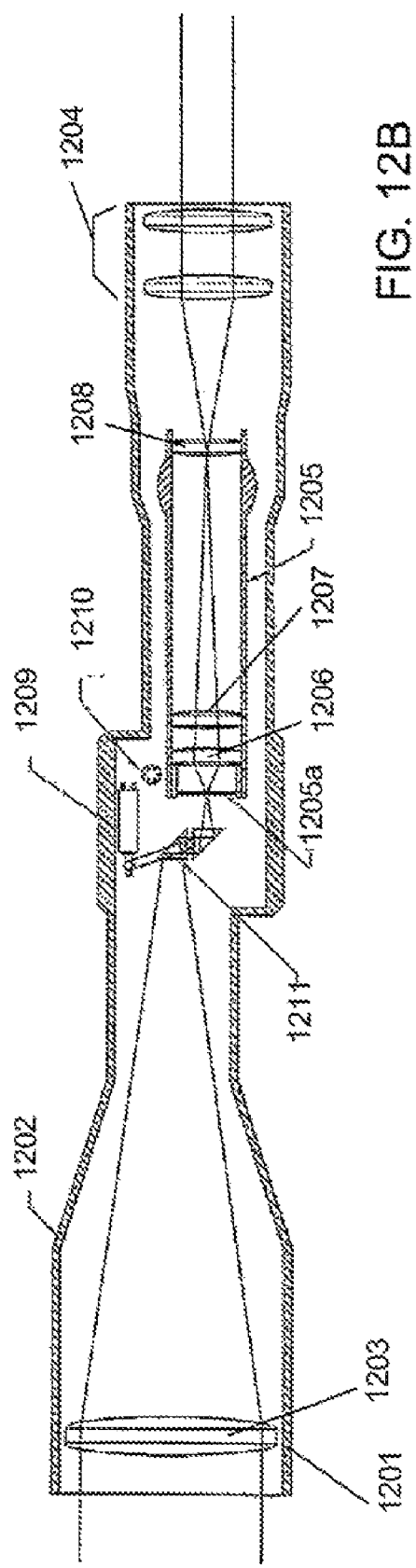

FIGS. 12A and 12B respectively depict top and side cutaway views of a fifth exemplary embodiment of an optical adjustment subsystem for an AOSS according to the present inventive concept, referred to as a "Rotating Prism" optical adjustment mechanism. FIGS. 12A and 12B show a telescopic sighting system 1201 having sighting system body 1202 containing a front lens assembly 1203, a rear lens assembly 1204, and a reticle tube 1205. Reticle tube 1205 includes a reticle 1205a, lenses 1206, 1207 and 1208. The optical adjustment subsystem includes a prism rotating actuator 1209, a reticle tube horizontal-adjustment actuator 1210, a reticle tube vertical adjustment actuator 1213, and a prism assembly 1211. Actuators 1209, 1210, and 1213 include well-known planetary gear and lead screw reduction mechanisms that are used for adjusting prism assembly 1211 and reticle tube assembly 1205. Prism rotating actuator 1209 is considered a coarse adjuster to keep the target image within the optical axis of the lens system and rotates prism assembly 1211 so that a target image is raised or lowered as viewed by an operator. Reticle tube horizontal-adjustment actuator 1210 and reticle tube vertical actuator 1213 are considered fine adjustment actuators and adjust the front of reticle tube 1105 either horizontally or vertically so that the reticle aiming point corresponds with the calculated position adjustments made by electronic subsystems 201 and 202. The rotated position of prism assembly 1211 and the horizontal and vertical position of the front of reticle tube 1105 can be detected by a position sensor (not shown) in a well-known manner and a signal corresponding to the detected position can be output for use by the AOSS according to the present inventive concept as feedback sensing and/or display to an operator. Additionally or alternatively, the position of reticle tube 1205 can be detected by a position sensor (not shown) and provided to the AOSS according to the present inventive concept. If deemed necessary horizontal positioning of the prisms 1111 and 1112 can be incorporated in a like manner as already described. An alternative exemplary embodiment provides only one adjustment actuator.

Figure 13:
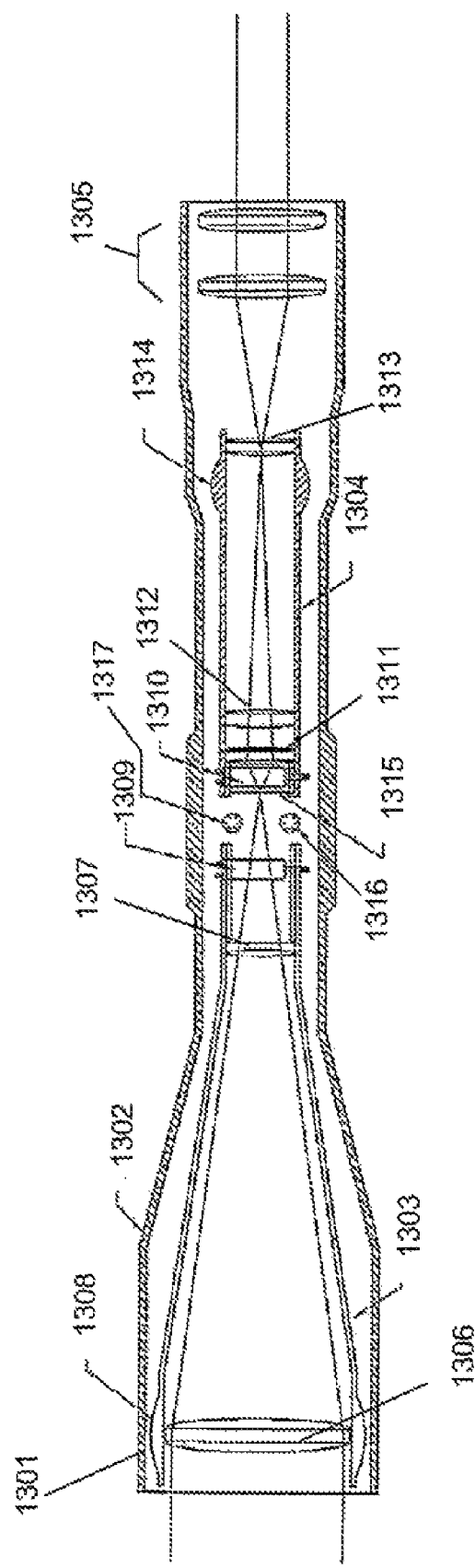
FIG. 13 respectively depicts a top view of a sixth exemplary embodiment of an optical adjustment subsystem for an AOSS according to the present inventive concept.

FIG. 13 depict top view of a sixth exemplary embodiment of an optical adjustment subsystem for an AOSS according to the present inventive concept, referred to as a "Dual Tube" optical adjustment mechanism. FIG. 13 shows a telescopic sighting system 1301 having sighting system body 1302 containing an objective tube 1303, a reticle tube 1304 and rear lens assembly 1305. Objective tube 1303 includes a front lens assembly 1306, a rear lens assembly 1307, and a pivot surface 1308. Pivot surface 1308 is in contact with an inner surface of sighting system body 1302. A vertical-adjustment actuator 1309 and a horizontal-adjustment actuator 1310 are each mechanically coupled to the rear portion of objective tube 1303. Vertical-adjustment actuator 1309 moves the rear portion of objective tube 1303 in a vertical direction, and horizontal-adjustment actuator 1310 moves the rear portion of objective tube 1303 in a horizontal direction. As objective tube 1303 is moved by actuators 1309 and 1310, objective tube 1303 pivots on pivot surface 1308.

Reticle tube 1304 includes lenses 1311, 1312 and 1313, a pivot surface 1314 and a reticle surface 1315. Pivot surface 1314 is in contact with an inner surface of sighting system body 1302. A vertical-adjustment actuator 1316 and a horizontal-adjustment actuator 1317 are each mechanically coupled to the front, or forward, portion of reticle tube 1304. Vertical-adjustment actuator 1316 moves the front portion of reticle tube 1304 in a vertical direction, and horizontal-adjustment actuator 1317 moves the front portion of reticle tube 1304 in a horizontal direction. As reticle tube 1304 is moved by actuators 1316 and 1317, reticle tube 1304 pivots on pivot surface 1314. The position of objective tube 1303 and/or reticle tube 1304 can be detected by a position sensors (not shown) in a well-known manner and signals corresponding to the detected position can be output for use by the AOSS according to the present inventive concept as feedback sensing and/or displayed to an operator. An alternative exemplary embodiment provides only one adjustment actuator.

FIGS. 14A and 14B respectively depict top and side cutaway views of a seventh exemplary embodiment of an optical adjustment subsystem for an AOSS according to the present inventive concept, referred to as a "Direct Drive Knob Mounted Actuator" optical adjustment mechanism (shown on an optical sighting system 1407). Adjuster 1400, when rotated, is used for adjusting one of elevation, crossrange, or parallax of an optical subsystem 204 (FIG. 2) of a telescopic sighting system 1406. Only one axis of adjustment is shown for clarity. Adjustor 1400 includes a turret knob 1401, an actuator 1402, a bevel drive gear 1403, a ring gear 1404, a reticle adjusting nut 1405, and an adjustor 1406. Actuator 1402 is, for example, a stepper or servo motor that includes a gear reduction mechanism (not shown) and a bevel drive gear 1403. Bevel drive gear 1403 engages ring gear 1404. Ring gear 1404 is mechanically coupled to the fixed adjuster base assembly 1408. The actuator 1402 with bevel gear 1403 are in turn mechanically coupled to the turret knob 1401, the reticle adjusting nut 1405 and, in turn mechanically coupled to adjustor 1406 via screw threads. As actuator 1402 drives bevel drive gear 1403, in response to electrical signals received from AOSS processor and controller subsystem 202 (FIG. 2), bevel drive gear 1403 drives around the fixed ring gear 1404. As the actuator 1402 is mechanically coupled to the turret knob 1401 which is in turn coupled to the adjustor nut 1405, and the rotation of the adjustor 1406 is fixed by passing through a slot in the sighting system housing 1407, the rotary movement of the actuator 1402, turret knob 1401 and, adjuster nut 1405 results in a linear movement of the adjuster 1406 whereby adjusting the optical sighting system parameter (i.e., elevation, windage, or parallax). A position sensor (not shown) can be located in proximity to ring gear 1403 for detecting the rotational position of adjustor 1400 in a well-known manner. The output of the position sensor is used by the AOSS as feedback sensing and/or displayed on a display associated with the AOSS.

FIGS. 15A and 15B respectively depict top and side cutaway views of an eighth exemplary embodiment of an optical adjustment subsystem for an AOSS according to the present inventive concept, referred to as a "Knob Axis Mounted" optical adjustment mechanism. FIG. 15A, in particular, is a cross-sectional view of adjustor 1500 taken along line A-A in FIG. 15B. Only one axis of adjustment is shown for clarity. Adjustor assembly 1500 includes an actuator 1501, an output center gear 1502, a set of planetary gears 1503, a ring gear 1504, an actuator mounting device 1505, an index ring 1506, a turret base plate 1507, and an adjustor 1508. Output center gear 1502 is mechanically coupled to the output shaft (not shown) of actuator 1501 and engages planetary gears 1503. Planetary gears 1503, in turn, engage ring gear 1504. Ring gear 1504 is fixedly attached to turret base plate 1507. Turret base plate is fixedly coupled to the optical sighting system 1510. The upper portion of adjuster 1508 is coupled to adjuster nut via screw threads whereas the lower portion of adjuster 1508 protrudes through a slot in the optical sighting system body 1510 and adjusts the position of reticle and lens housing 1509 within sighting system body 1510.

Actuator 1501 rotates the output drive shaft in a selected direction in response to signals received from AOSS processor and controller subsystem 202 (FIG. 2). The drive output shaft of actuator 1501 rotates output center gear 1502, which, in turn, rotates planetary gears 1503. The rotation of planetary gears 1503 within the fixed ring gear 1504 results in the rotation of the planetary gears 1503, which are housed within the adjuster nut 1508, and the rotation the actuator mounting device 1505. As the lower portion of adjustor 1508 protrudes through a slot in the optical sighting system body 1510 and is fixed against rotation, the rotation of the adjuster nut 1508 results in the linear movement of adjuster 1508 whereby adjusting the position of reticle and lens housing 1509 within sighting system body 1510.

Adjustor assembly 1500 also include a locking/disengaging setscrew 1511 that is inserted into a set screw hole at 1511 for purposes of locking and unlocking the position of adjustor 1508 for initial zeroing of the index ring 1506. Additionally, a position sensor 1513 may be included within adjustor assembly 1500 for detecting the rotational position of adjustor assembly 1500 for feedback sensing and/or display on a display associated with the AOSS.

FIGS. 16A and 16B respectively depict top and side cutaway views of an ninth exemplary embodiment of an optical adjustment subsystem for an AOSS according to the present inventive concept, referred to as a "Base Mounted Worm Drive" optical adjustment mechanism. FIG. 16A, in particular, is a cross-sectional view of adjustor 1600 taken along line A-A in FIG. 16B. Only one axis of adjustment is shown for clarity. Adjustor assembly 1600 includes an actuator 1601, a worm gear 1602, a worm-driven gear 1603, an adjustor 1604, an adjusting nut 1605, a spring-loaded ratchet 1606, a turret base plate 1607 and an index ring 1608. Actuator 1601 engages worm gear 1602, which, in turn, engages worm-driven gear 1603. Worm-driven gear 1603 is mechanically coupled to adjusting nut 1605. The upper portion of adjuster 1604 is coupled to adjuster nut 1605 via screw threads whereas the lower portion of adjustor 1604 protrudes through a slot in the optical sighting system body 1610 and adjusts the position of reticle and lens housing 1609 within sighting system body 1610. Actuator 1601 rotates worm gear 1602 in a selected direction in response to signals received from AOSS processor and controller subsystem 202 (FIG. 2). Worm gear 1602 drives worm-driven gear 1603 which, in turn, drives adjustor nut 1605. As the lower portion of adjustor 1604 protrudes through a slot in the optical sighting system body 1610 and is fixed against rotation, the rotation of the adjuster nut 1605 results in the linear movement of adjuster 1604 whereby adjusting the position of reticle and lens housing 1609 within sighting system body 1610.

Adjustor assembly 1600 can also include a locking/disengaging setscrew that is inserted into a set screw hole 1612 for purposes of locking and unlocking the position of index ring 1608 on adjuster nut 1605 for initial zeroing of index ring 1608. Additionally, a position sensor 1611 could be included within adjustor assembly 1600 for detecting the rotational position of adjustor assembly 1600 for feedback sensing and/or display on a display associated with the AOSS.

Exemplary adjustor assembly 1600 shown in FIGS. 16A and 16B includes a automatic/manual selection option that permits the rotational position of adjustor assembly 1600 to be automatically controlled by an AOSS, or manually controlled in the event of, for example, power and/or actuator failure. As shown in FIGS. 16A and 16B, automatic/manual selection option 1700 can be configured like exemplary embodiment of an automatic/manual selection device 1700 shown in FIGS. 17A-17D. Alternatively, automatic/manual selection knob 1700 can be configured like exemplary embodiment of an automatic/manual selection device 1800 shown in FIGS. 18A-18D.

FIGS. 19A and 19B respectively depict top and side cutaway views of a tenth exemplary embodiment of an optical adjustment subsystem for an AOSS according to the present inventive concept, referred to as a "Side Mounted Spur Gear Drive" optical adjustment mechanism. Only one axis of adjustment is shown for clarity. Adjustor assembly 1900 includes an actuator 1901, an intermediate gear 1902, an adjusting nut gear 1903, an adjusting nut 1904, an adjustor 1905, a spring-loaded ratchet 1906, a turret base plate 1907, and an index ring 1908. Actuator 1901 engages intermediate gear 1902, which, in turn, engages adjusting nut gear 1903. Adjusting nut gear 1903 is mechanically coupled to adjusting nut 1904, which, in turn, is mechanically coupled via screw threads to adjustor 1905. Adjustor 1905 adjusts the position of reticle and lens housing 1909 within sighting system body 1910. Actuator 1901 rotates intermediate gear 1902 in a selected direction in response to signals received from AOSS processor and controller subsystem 202 (FIG. 2). Intermediate gear 1902 drives adjusting nut gear 1903, which, in turn, drives adjustor nut 1904. As the lower portion of adjustor 1905 protrudes through a slot in the optical sighting system body 1910 and is fixed against rotation, the rotation of the adjuster nut 1904 results in the linear movement of adjuster 1905 whereby adjusting the position of reticle and lens housing 1909 within sighting system body 1910.

Adjustor assembly 1900 can also include a locking/disengaging setscrew that is inserted into a set screw hole 1911 for purposes of locking and unlocking the position of index ring 1908 on adjuster nut 1904 for initial zeroing of index ring 1908. Additionally, a position sensor 1912 could be included within adjustor assembly 1900 for detecting the rotational position of adjustor assembly 1900 for feedback sensing and/or display on a display associated with the AOSS.

Exemplary adjustor assembly 1900 shown in FIGS. 19A and 19B includes a automatic/manual selection option that permits the rotational position of adjustor assembly 1900 to be automatically controlled by an AOSS, or manually controlled in the event of, for example, power or actuator failure. As shown in FIGS. 19A and 19B, automatic/manual selection knob 1920 can be configured like exemplary embodiment of an automatic/manual selection device 1700 shown in FIGS. 17A-17D. Alternatively, automatic/manual selection knob 1920 can be configured like exemplary embodiment of an automatic/manual selection device 1800 shown in FIGS. 18A-18D.

Figure 17A:
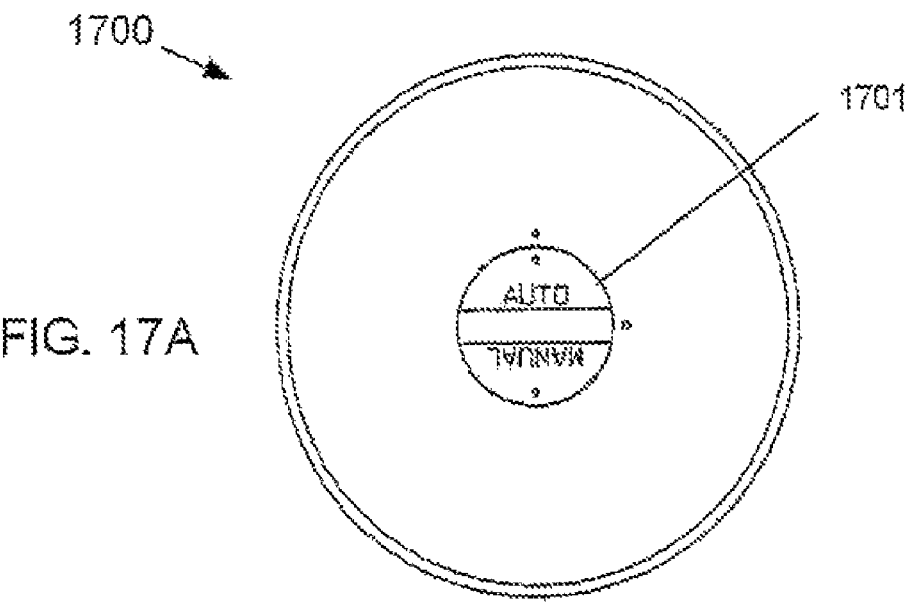
FIGS. 17A-17D show details of an exemplary embodiment of a first automatic/manual selection device that can be used with the adjustor assemblies shown in FIGS. 4, 5, 6, 7, 9A, 9B, 10A, 10B, 16A, 16B, 19A and 19B.
Figure 17B:
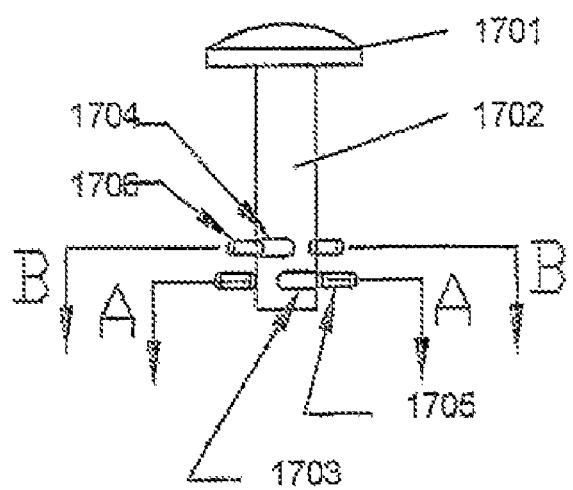
Figure 17C:
Figure 17D:
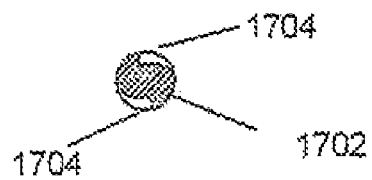

FIGS. 17A-17D show details of a first exemplary embodiment of an automatic/manual selection device 1700 that can be used with adjustor assembly 1600. Automatic/manual selection device 1700 operates by selecting a rotational position of the device to select an automatic or a manual adjustment mode. FIG. 17A shows a top view of automatic/manual selection device 1700. FIG. 17B shows a side view of selection knob 1701 and shaft 1702. FIG. 17C shows a cross-sectional view of shaft 1702 as viewed through line A-A in FIG. 17B. FIG. 17D shows a cross-sectional view of shaft 1702 as viewed through line B-B in FIG. 17B. Automatic/manual selection device 1700 includes a knob 1701, a shaft 1702, helical cam surfaces 1703, and helical cam surfaces 1704. Helical cam surfaces 1703 (FIG. 17C) and helical cam surfaces 1704 (FIG. 17D) respectively engage and disengage locking pins 1705 and 1706 depending on the rotatable position of knob 1701 and shaft 1702. When knob 1701 is in the "automatic" position, locking pins 1705 engage worm-driven gear 1603 (FIGS. 16A and 16B), locking pins 1706 are disengaged from spring-loaded ratchet 1606 (FIGS. 16A and 16B), and the rotational position of adjustor assembly 1600 is controlled by the AOSS. When knob 1701 and integral shaft 1605 is in the "manual" position, locking pins 1706 are engaged with spring-loaded ratchet 1606, locking pins 1705 are disengaged from meshing center gear 1603, and the rotational position of adjustor assembly 1600 is manually controlled. It should be understood that locking balls could be used in a well-known manner as an alternative to locking pins 1705 and 1706.

Figure 18A:
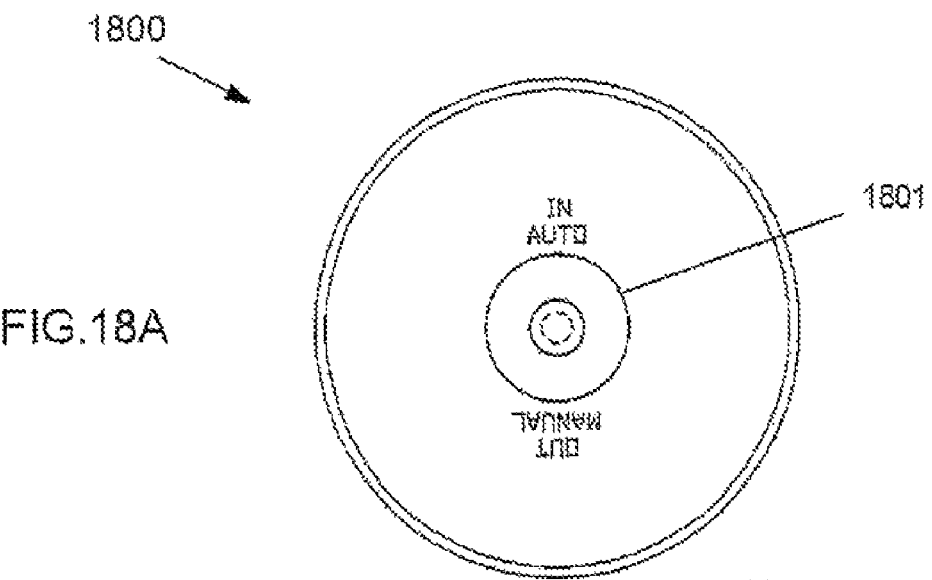
FIGS. 18A-18D show details of an exemplary alternative embodiment of a second automatic/manual selection device that can be used with the adjustor assemblies shown in FIGS. 4, 5, 6, 7, 9A, 9B, 10A, 10B, 16A, 16B, 19A and 19B.
Figure 18B:
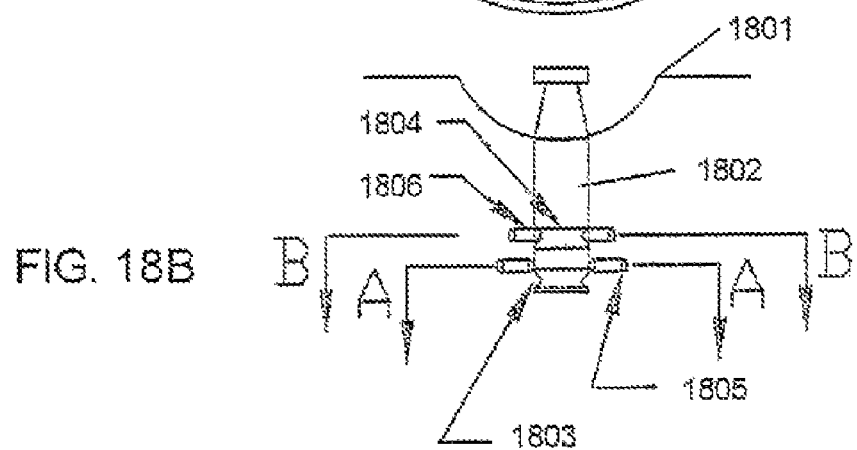
Figure 18C:
Figure 18D:

FIGS. 18A-18D show details of a second exemplary alternative embodiment of an automatic/manual selection device 1800 that can be used with adjustor assemblies 660, 1000, 1600, 1900. Adjustor assembly 1600 (FIGS. 16A and 16B) is used for illustration. Automatic/manual selection device 1800 operates in a push/pull manner to select an automatic or a manual adjustment mode. FIG. 18A shows a top view of automatic/manual selection device 1800. FIG. 18B shows a side/section view of the depression in turret knob/selection knob 1801 and shaft 1802. FIG. 18C shows a cross-sectional view of shaft 1802 as viewed through line A-A in FIG. 18B. FIG. 18D shows a cross-sectional view of shaft 1802 as viewed through line B-B in FIG. 18B.

Automatic/manual selection device 1800 includes a knob depression 1801, a shaft 1802, circumferential groove 1803, and circumferential groove 1804. Circumferential groove 1803 (FIG. 18B) and circumferential groove 1804 (FIG. 18B) respectively engage and disengage locking pins 1805 and 1806 depending on the push/pull position of shaft 1802. When shaft 1802 is in the "automatic" (in) position, locking pins 1805 engage worm-driven gear 1603 (FIGS. 16A and 16B), locking pins 1806 are disengaged from spring-loaded ratchet 1606 (FIGS. 16A and 16B), and the rotational position of adjustor assemblies is controlled by the AOSS. When knob 1801 is in the "manual" (out) position, locking pins 1806 are engaged with spring-loaded ratchet 1606, locking pins 1805 are disengaged from worm-driven gear 1603, and the rotational position of the adjustor assembly is manually controlled. It should be understood that locking balls could be used in a well-known manner as an alternative to locking pins 1805 and 1806.

Operation of the exemplary embodiments of an AOSS according to the present inventive concept depicted in FIGS. 6-13 is similar to the operation of the exemplary AOSS depicted in FIGS. 2-5. For example, operation typically begins with a marksman determining the mission-specific ammunition that will be used. The marksman then enters the ammunition information into memory of the AOSS through data input port 614, which may accept data input through, for example, a wired and/or wireless data link from, for example, another processing system. Additionally or alternatively, the marksman has the ability to manually input projectile flight data and ambient conditions via manual input device 615, and, in one exemplary embodiment, through a touchscreen. Before the mission, the marksman may test-fire the firearm to verify proper operation of the system over its designed operational range.

To operate the system, the marksman may determine the target distance using, e.g., handheld optical or laser rangefinders, or through estimation. This information may be input via the manual input device 615, or directly from, e.g., rangefinder sensor. Just before the shot, the shooter depresses a "start" button on the AOSS unit or remote subsystem, for example, manual input device 615, which signals the electronics to take a range distance measurement to the intended target, ambient weather sensor measurements in the vicinity of the AOSS unit, geographic firing direction of the firearm from the magnetic compass, a firing inclination angle measurement, and retrieve projectile performance data from electronic memory to determine the flight characteristics of the projectile at the measured or estimated distance. Upon completion of the determinations, the electronics subsystems send control signals for adjusting, via the appropriate actuator, the, elevation, windage and lens parallax adjusters for rotary knob embodiments (FIGS. 14, 15, 16 and 19), a dual tube embodiment (FIG. 13), a moving prism embodiment (FIG. 11), a rotating prism embodiment (FIG. 12), eccentric cam embodiment (FIG. 10), or a multi-step ring embodiment (FIGS. 8 and 9). Should adjustment values of the actuators, as determined by the electronic subsystems, cause the target image path through the lens system to fall out of the optical path of the lens systems, coarse adjustments to the image path may be accomplished with the multi-step ring embodiment (FIGS. 8 and 9), the moving prism embodiment (FIG. 11), the rotating prism embodiment (FIG. 12), and the front portion of the dual tube embodiment (FIG. 13). Adjustments of the reticle tube assembly for target images that pass along the optical axis of the lens systems are made with the rotary knob embodiments (FIGS. 14, 15, 16 and 19), eccentric cam embodiment (FIG. 10), the rear portion of the dual tube embodiment (FIG. 13). The embodiments are not exclusively used for either purpose and may be used individually or together to accomplish the required alteration of image path and reticle movement to place the reticle aiming point in the line of sight to deliver the projectile to the desired point of impact at the target as determined by the AOSS electronics subsystems. Position of the actuator(s) and/or adjuster(s) may be verified by an optical/digital encoder, and adjusters may be re-adjusted if necessary.

When the adjustment sequence is complete, a "green" light emitting diode (LED), or other applicable indicating device, may signal the marksman to initiate the firing sequence. The AOSS may be programmed so that a follow-up shot may be taken within a predetermined period of time programmed into the AOSS prior to the automatic resetting the system. Automatic resetting may be overridden via input device, if desired.

In operation of any of the embodiments described above, the processor system determines precise and accurate aiming adjustments and actuator commands based on the some or all of the following algorithms and measured or estimated parameters: (1) a precise numerical integration of the equations of motion of the projectile, including the three-dimensional wind components (head/tail winds, crosswind, and vertical wind); (2) the ballistic properties of the projectile (e.g., initial velocity, ballistic coefficients or coefficient of drag, transverse and axial moments of inertia, spin rate, etc.); (3) the range distance from the firing point to the target; (4) the inclination angle of fire; (5) the altitude of the firing point; (6) the atmospheric conditions (barometric pressure, air temperature, relative humidity) at the firing point; (7) temperature-dependent variations in muzzle velocity of the firearm; (8) Coriolis accelerations dependent on latitude, longitude, and firing direction at the firing point; and (9) six-degree-of-freedom dependencies of the projectile, including spin drift (also known as Yaw of Repose drift).

As described, one exemplary embodiment of the present inventive concept can utilize machine-executable instructions for determining sighting-system aiming point changes that are necessary for producing a desired projectile point-of-impact. A suitable set of machine-executable instructions that can be utilized for the present inventive concept is similar to the Sierra Infinity Exterior Ballistics Software, which have been produced and copyrighted by the present inventors, and is manufactured by Sierra Bullets, 1400 West Henry Street, Sedalia, Mo. 65301. A description of the machine-executable instructions embodied within an exemplary AOSS according to the present inventive concept is as follows.

Software Technical Description

Figure 21:
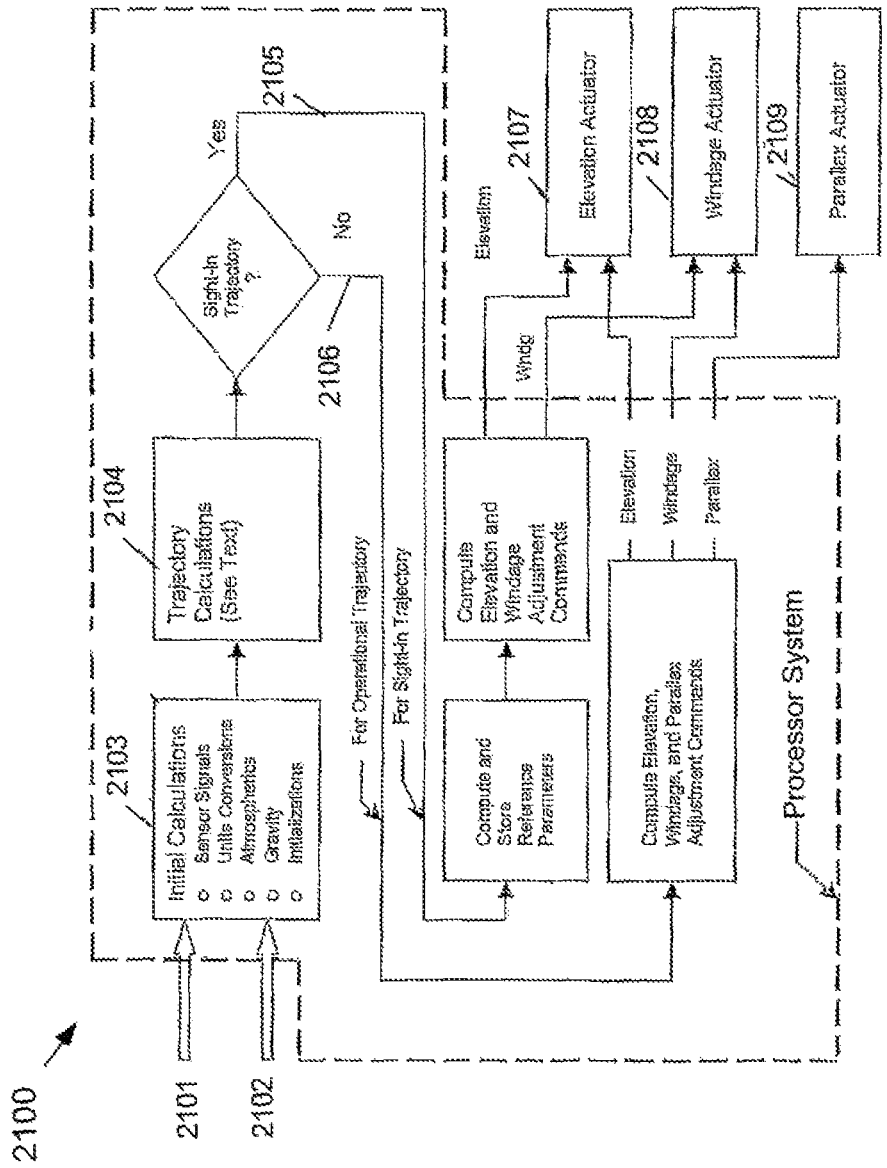
FIG. 21 illustrates in particular the functions performed by an AOSS processor system according to the present inventive concept.

The physical laws and necessary mathematics of exterior ballistics are well known and documented in the public domain. See, for example, E. J. McShane et al., "Exterior Ballistics," University of Denver Press, 1953; and R. L. McCoy, "Modern Exterior Ballistics," Schiffer Publishing, Ltd., Atglen, Pa., 1999, both of which are incorporated by reference herein. The software coding languages and techniques for processor systems are likewise readily available from microcomputer hardware/software vendors or other sources in the public domain. The application of a processor system solving the equations of motion of a projectile in flight for the purpose of automatic, near-real time aiming of a small arm is a novel invention, and the algorithmic implementations of the physics and mathematics of Exterior Ballistics within an AOSS processor system are novel features of this invention. FIG. 20 is a system-level diagram of the AOSS showing signal flow from sensor devices through a processor system to the actuators for elevation and windage (crossrange) sighting adjustments and for parallax adjustments. FIG. 21 illustrates in particular the functions performed by an AOSS processor system according to the present inventive concept. The operations and algorithms used to implement these functions are described in detail in the paragraphs that follow. It should be understood that the exemplary embodiment described below including illustrative tolerances, accuracy limits, and other specific numerical values, is illustrative in nature and in no way limits the scope or spirit of the invention.

1.0 Sighting-in (Zeroing-in) Procedure

The processor system software implementations for actual targets in the field require a pre-operational procedure that is performed by the firearm operator (shooter) before going into the field. This procedure, familiar to shooters, is to sight in the firearm under known conditions at the sight-in firing range location. For an AOSS, this procedure establishes a "home" position for the optical element. The known conditions at the sight-in range are measured range distance from firing point to target, altitude above sea level, ambient atmospheric conditions (absolute barometric pressure, temperature, and relative humidity), wind speed and direction, gravitational acceleration, and inclination angle of the target with respect to local level at the firing point. These conditions may be taken from instruments within the AOSS or from external sources, or in some cases may be determined by the processor system from sensor signals.

The sight-in procedure is not greatly different from operations against a target in the field, except that certain parameters are stored in long term memory within the processor system as "home" values to which the AOSS can return upon command at any time, and also whenever power is turned off to the processor system. That is, when a power turnoff is performed by the firearm operator, the AOSS will return to the "home" position to make ready for a subsequent operation. The sight-in procedure begins with adjusting the parallax correction for the zero range distance to be used. Then, enough rounds are fired in the firearm and sights are adjusted until a group of rounds (typically 3, 5, or 10) impacting the target is centered within or on an aiming spot on the target. The group size may be any number of rounds preferred by the firearm operator or established by custom or policy from authorities. All elevation and windage adjustments are made manually by mechanical means on the optical element. When this accuracy criterion has been satisfied, the processor system determines the following parameters:

$\alpha = \tan^{-1}(h_S/R_0) \approx h_S/R_0$ (a very small angle)

$\beta = -\tan^{-1}(y_0 - Y\text{def})/R_0) \approx -(y_0 - Y\text{def})/R_0$ (a small angle)

$Y\text{def} = 17.6 V_{VW}[1.0 - (V_{Xref}/V_m)]$ $Z\text{def} = 17.6 V_{CW}[1.0 - (V_{Xref}/V_m)]$ Elevation Command $= -Y\text{def}/(R_0 * K_{elevation})$ Windage Command $= -Z\text{def}/(R_0 * K_{windage})$ $\theta_{ref}$ $R_0$ $y_0$ where $h_S$ is the height of the optical center line of the AOSS above the centerline of the firearm bore;

$R_0$ is the measured distance from firing point to target (zero range);

$y_0$ is the y coordinate of the reference trajectory evaluated at $x_{ref} = R_0$ (always negative);

$x_{ref}$ is the x coordinate of the reference trajectory (always positive);

$K_{elevation}$ is the scale factor of the elevation actuator subassembly (see Section 3.3.6);

$K_{windage}$ is the scale factor of the windage actuator subassembly (see Section 3.3.6);

$V_{VW}$ is the speed of the vertical wind component in miles per hour (positive when directed upwards as seen by the firearm operator);

$Y$def is the deflection of the impact point at the target in the y-direction caused by the vertical wind component;

$Z$def is the deflection of the impact point at the target in the z-direction caused by the crosswind component;

$V_{CW}$ is the speed of the crosswind component in miles per hour (positive when directed from left to right as seen by the firearm operator);

$V_{VW}$ is the speed of the vertical wind component in miles per hour (positive when directed upward as seen by the firearm operator);

$V_{Xref}$ is the speed of the projectile in the x direction evaluated at the range distance $R_0$;

$V_m$ is the muzzle velocity of the firearm;

$\theta_{ref}$ is the inclination angle of the reference trajectory.

The angles $\alpha$ and $\beta$ are "home" values for the optical subsystem which are stored for use in all subsequent trajectory computations until another sighting-in procedure is performed. The Elevation Command and Windage Command correct for deflections of the optical line of sight caused by any vertical wind and/or crosswind experienced during the sighting-in procedure. For example, if there is a vertical wind, the optical line of sight has been adjusted manually to compensate the elevation angle of the optical line of sight for the vertical wind and to cause the reference trajectory to pass through the aiming point on the target. To establish a "home" position for the elevation of the optical line of sight, the vertical wind effect must be removed. This would make the reference trajectory pass through the target in the absence of any vertical wind, and that is the "home" position for elevation. A similar situation applies to the windage correction. The Elevation Command and the Windage Command for the sight-in procedure are issued to the actuators after the procedure is completed by the firearm operator. Then, the "home" position for the AOSS is the following:

A reference trajectory which passes through the target at the sight-in range $R_0$ in the absence of wind. This is characterized by the angles $\alpha$ and $\beta$ used in subsequent trajectory calculations;

A zero reference where Elevation=0 and Windage=0 for all subsequent trajectory calculations.

The reference range distance $R_0$ for subsequent parallax adjustment calculations.

Ideally, the sight-in operation would be performed on a firing range which is level and with no wind. In a practical situation the sight-in range distance (zero range) should be chosen so that angle $\beta < 20$ minutes of angle (5.82 milliradians). The firing range inclination angle should be within ±5 degrees and the wind component speeds should be no greater than 5 miles per hour. There are no other restrictions on the sight-in range location relative to the operational location for the firearm. The absence of other restrictions is a unique feature of the present inventive concept.

2.0 Sensor Complement

During operations in the field, the processor system operates with information stored within its memory, signals received from the sensor complement, and parameters entered by the firearm operator via the keyboard or touchscreen or other devices. The sensors include (referring to FIG. 3):

Rangefinder—This instrument measures the point-to-point range distance from the firearm to the target in units of meters, yards, or feet. The output signal from the Rangefinder is most likely to be in digital format. If so, this signal will pass directly through sensor interface and signal conditioner 311 in FIG. 3. If the signal is in analog format, it will first undergo analog-to-digital conversion (sensor interface and signal conditioner 311) and then pass into the processor system. The resolution of this signal will be no coarser than 1.0 meter or yard, and the full scale range of the signal will be from zero meters or yards to a value corresponding to the maximum range of this instrument.

Inclination Angle Sensor—This instrument measures the elevation or depression angle of the target as viewed from the firing point in units of radians or degrees with respect to the horizontal plane at the firing point. The output signal from the Inclination Angle Sensor may be in either analog or digital format. If the signal is in analog format, it will first undergo an analog-to-digital conversion (sensor interface and signal conditioner 311), and then be input to the processor system. If the signal is in digital format, it will pass directly through sensor interface and signal conditioner 311 and into the processor system. The resolution of this signal will be at least 0.1 minutes of angle (MOA) if controllable by system design. A coarser resolution may be necessary depending on the capability of the Inclination Angle Sensor. The full scale range of this signal will be from the maximum depression angle to the maximum elevation angle of the instrument. Typically, this full scale range will be from −60 degrees (depression) to +60 degrees (elevation). Larger or smaller full scale angles between 0 and ±90 degrees, however, are allowed.

Temperature Sensor—This instrument measures the ambient temperature at the firing location in units of degrees Fahrenheit or degrees Celsius. The output signal of the Temperature Sensor may be in either analog or digital format. If the signal is in analog format, it must first undergo analog-to-digital conversion (sensor interface and signal conditioner 311), and then be input to the processor system. If the signal is in digital format, it will pass directly through sensor interface and signal conditioner 311 and into the processor system. The resolution of this signal will be 0.1 degree Fahrenheit (0.055 degree Celsius) if controllable by system design. A coarser resolution may be necessary depending on the capability of the Temperature Sensor. The full scale range of this signal will be from −40 degrees Fahrenheit (−40 degrees Celsius) to +140 degrees Fahrenheit (+60 degrees Celsius).

Pressure Sensor—This instrument measures the absolute ambient atmospheric pressure at the firing location in units of inches of mercury or millimeters of mercury or millibars. The output signal of the Pressure Sensor may be in either analog or digital format. If the signal is in analog format, it must first undergo analog-to-digital conversion (sensor interface and signal conditioner 311), and then be input to the processor system. If the signal is in digital format, it will pass directly through sensor interface and signal conditioner 311 and into the processor system. The resolution of this signal will be 0.01 inch of mercury (0.254 millimeter of mercury or 0.3396 millibar) if controllable by system design. A coarser resolution may be necessary depending on the capability of the Pressure Sensor. The full scale range of this signal will be from 16 inches of mercury (406.4 millimeters of mercury or 542 millibars) for a firing point altitude of 15000 feet, to 31 inches of mercury (787 millimeters of mercury or 1050 millibars) for extreme atmospheric conditions at sea level.

Humidity sensor—This instrument measures the ambient relative humidity at the firing point location in units of percent. The output signal of the Humidity Sensor may be in either analog or digital format. If the signal is in analog format, it must first undergo analog-to-digital conversion (sensor interface and signal conditioner 311), and then be input to the processor system. If the signal is in digital format, it will pass directly through sensor interface and signal conditioner 311 and into the processor system. The resolution of this signal will be 1.0 percent if controllable by system design. A coarser resolution may be necessary depending on the capability of the Humidity Sensor. The full scale range of this signal will be from 0 to 100 percent.

Magnetic Compass—This instrument measures the magnetic bearing of the firing direction from the firing point to the target in degrees of magnetic azimuth in order to facilitate Coriolis corrections, if necessary. Dependent on the internal design of this instrument, the Magnetic Compass may have either one or two output signals. If the instrument can resolve the azimuth direction by electro-optical, electromechanical, or electromagnetic techniques, the instrument may have only one output signal encoding an angle between 0 and 360 degrees (or between −180 and +180 degrees). If the instrument cannot resolve the azimuth angle internally, it will have two output signals, typically one representing the east-west projection of the magnetic bearing, and the other representing the north-south projection of the magnetic bearing, with resolving the magnetic bearing to be performed within the processor system. The output signal(s) of the Magnetic Sensor may be in either analog or digital format. If the signal(s) is in analog format, it must first undergo analog-to-digital conversion (sensor interface and signal conditioner 311), and then be input to the processor system. If the signal(s) is in digital format, it will pass directly through sensor interface and signal conditioner 311 and into the processor system. The resolution of the signal(s) will be 1.0 degree of magnetic azimuth if controllable by system design, regardless of whether the resolution is performed within the Magnetic Sensor or within the processor system. A coarser resolution may be necessary depending on the capability of the Magnetic Sensor. The full scale range of magnetic azimuth will be from 0 to 360 degrees (or from −180 to +180 degrees).

Crosswind Sensor—This sensor measures the speed of any wind component in a horizontal direction and perpendicular to the firearm operator's line of sight from the firing point to the target, in units of feet per second, miles per hour, or kilometers per hour. The output signal of the Crosswind Sensor may be in either analog or digital format. If the signal is in analog format, it must first undergo analog-to-digital conversion (sensor interface and signal conditioner 311), and then be input to the processor system. If the signal is in digital format, it will pass directly through sensor interface and signal conditioner 311 and into the processor system. The resolution of this signal will be 0.1 statute mile per hour (equivalent to 0.147 foot per second or 0.0447 meter per second) if controllable by system design. A coarser resolution may be necessary depending on the capability of the Crosswind Sensor. The full scale range of this signal will be from −30 to +30 statute miles per hour (equivalent to ±44.0 feet per second or ±13.411 meters per second).

Vertical Wind Sensor—This sensor measures the speed of any wind component in the vertical plane at the firing point and perpendicular to the line of sight from firing point to target, in units of feet per second, miles per hour, or kilometers per hour. The output signal of the Vertical Wind Sensor may be in either analog or digital format. If the signal is in analog format, it must first undergo analog-to-digital conversion (sensor interface and signal conditioner 311), and then be input to the processor system. If the signal is in digital format, it will pass directly through sensor interface and signal conditioner 311 and into the processor system. The resolution of this signal will be 0.1 statute mile per hour (equivalent to 0.147 foot per second or 0.0447 meter per second) if controllable by system design. A coarser resolution may be necessary depending on the capability of the Crosswind Sensor. The full scale range of this signal will be from −30 to +30 statute miles per hour (equivalent to ±44.0 feet per second or ±13.411 meters per second).

Headwind/Tailwind Sensor—This sensor measures the speed of any wind component in the direction of the line of sight from firing point to target at the firing location in units of feet per second, miles per hour, or kilometers per hour. The output signal of the Headwind/Tailwind Sensor may be in either analog or digital format. If the signal is in analog format, it must first undergo analog-to-digital conversion (sensor interface and signal conditioner 311), and then be input to the processor system. If the signal is in digital format, it will pass directly through sensor interface and signal conditioner 311 and into the processor system. The resolution of this signal will be 0.1 statute mile per hour (equivalent to 0.147 foot per second or 0.0447 meter per second) if controllable by system design. A coarser resolution may be necessary depending on the capability of the Headwind/Tailwind Sensor. The full scale range of this signal will be from −30 to +30 statute miles per hour (equivalent to ±44.0 feet per second or ±13.411 meters per second).

Global Positioning System (GPS) Sensor—This sensor is normally carried by the firearm operator or nearby companion and not necessarily attached to the firearm. That is why the GPS sensor is shown in dotted lines in FIG. 3. In either case the GPS Sensor provides the geodetic coordinates of latitude, longitude, and altitude at the firing point. Time of day is also provided for the convenience of the firearm operator. At the present state-of-the-art this sensor is not connected directly to the processor system, but in the future GPS receivers may become small enough and low enough in electrical power consumption that location within the AOSS hardware becomes practical. At the present time, the firearm operator would manually enter the geodetic coordinates into the processor system via the Keyboard. In the future, these parameters may be transferred directly to the AOSS processor system from the GPS receiver. The resolution and accuracy of GPS coordinates are sufficient for applications in small arms aiming and firing. It is important to note that firing direction cannot be determined by the GPS if the observer is stationary, so that the Magnetic Compass will be required for Coriolis corrections if the GPS Sensor is used. The sensors described above are all within the present state-of-the-art and they are continually being improved by their manufacturers. The inclusion of all or any combination of these sensors within the AOSS to facilitate automatic aiming corrections by way of a processor system and actuator hardware is part of the present inventive concept.

Not all the instruments in this list may be necessary. For example, if wind corrections are left to the judgment of the firearm operator(s), the wind sensors will not be needed. Similarly, Coriolis corrections to the trajectory are generally unnecessary when the maximum effective range of the firearm is less than about 800 meters. In such a case the magnetic compass will not be necessary. Also, if Coriolis corrections are not necessary, latitude and longitude at the firing point are unnecessary, and altitude may be determined with requisite accuracy from the atmospheric conditions at the firing point. In that case the GPS Sensor would not be needed. Furthermore, relative humidity influences on trajectories are small except for extreme weather conditions, and thus the humidity sensor may not be needed. In practice, the instrument list will be tailored to the ammunition, characteristics of the firearm, and the environment in which the firearm is to be utilized. The full sensor complement described above will enable the AOSS to accurately determine and apply aiming corrections to a baseline projectile trajectory for any commercial or military small arm out to its maximum effective range. A reduced complement of sensors may be specifically tailored for the ammunition, firing environment, or limited effective range of the firearm. In either case, full complement or reduced complement, the AOSS will provide accurate aiming corrections for the firearm.

Also, in the event of instrument failure or other happenstance, the firearm operator(s) may input estimates of needed signals into the processor system via the manual input port (keyboard, touchscreen, or other device). Manual entries will override any and all instrument signals at all times.

Information that must be entered by the firearm operator(s) via the manual input port includes:

Height of the optical axis of the telescope above the centerline of the bore of the firearm (referred to as sight height and symbolized as $h_S$) in inches.

The speed of the projectile at the muzzle of the firearm (often called the muzzle velocity $V_m$) in feet per second.

All coefficients related to forces and moments which act on the projectile in flight. These are properties of the projectile and change with the dynamic model used to characterize the projectile in flight.

3.0 Processor System Operations

The English system of physical units (feet, pounds, seconds) is used in calculations in the AOSS processor system. Two reasons for this choice are (1) the parameters characterizing the projectile (mass properties, aerodynamic forces and torques) are available in English units, and (2) these units are most familiar to users educated in the United States.

3.1 Initial Determinations

Initial calculations take place to prepare for the numerical computation of the projectile trajectory. These calculations are started when the firearm operator causes a "Begin" or similarly entitled command to the AOSS processor system via the manual input port or other device.

3.1.1 Sensor Signal Determinations

Referring to FIG. 21, the digital signals from all instruments 2101 and operator entered data 2102, are entered into the processor system 2100. The first functional operation 2103 is to determine the value of each sensed physical quantity from the instrument output signal measured by the AOSS. Each sensor is characterized by an input/output relationship (transfer function) of the form:

$$O = k_0 + k_1 I + k_2 I^2 \qquad (1)$$

Where in this equation:
- O is the sensor output signal (a digital word at the input to the processor system);
- I is the physical input signal (angle, distance, velocity, etc.) sensed by the instrument which caused the output signal O;
- $k_0$ is a null offset number (also called a bias), being the sensor output signal when the input signal I is null;
- $k_1$ is the scale factor of the sensor (also called the gain or the sensitivity of the sensor);
- $k_2$ is the coefficient of a second-order small term multiplying the square of the physical input signal (also known as the scale factor nonlinearity when divided by $k_1$).

The form of this equation is correct for the AOSS sensors, but the coefficients may change value for negative vis-a-vis positive input signals (negative vis-a-vis positive values of I), so that negative input signals must be treated separately from positive input signals. Equation (1) would then have two forms, one for positive values of I and a second for negative values of I. In either case, if the term $k_2 I^2$ is much less than $(k_0 + k_1 I)$ in Equation (1), then $k_2 I^2$ may be ignored. For this case the physical input signal may be determined from Equation (2):

$$I = (O - k_0)/k_1 \qquad (2)$$

If the term $k_2 I^2$ is not negligible, then the physical input signal to the sensor may be determined from:

$$I = (k_1/2k_2)\{-1 + [1 + (4k_2/k_1^2)(O - k_0)]^{1/2}\} \qquad (3)$$

For convenience in programming the processor system, alternative forms of Equation (3) may be derived for cases in which $k_2 I^2$ is small but not negligible by expanding the square-root term in a power series of sufficient length, as will be recognized by a person skilled in mathematics and computer programming.

The computation described above is performed for each sensor shown in FIG. 3. The result is that the processor system has values of all the physical parameters sensed in the physical units used in the design of the sensor (meters, feet, yards, feet per second, meters per second, degrees, minutes of angle, artillery mils, etc.). The physical units of any variables input to the processor system via the manual input port will have units familiar to the firearm operator(s).

3.1.2 Physical Units Conversions

The next initializing calculation is to convert the physical units of all input parameters to a consistent set for trajectory calculations in the English system. Where parameters are provided or needed in the metric system, unit conversions will be made in the processor system where necessary for input data or output commands. Unit conversions will utilize conversion factors available from reference Tables of Conversions in the public domain, or derivable from those references. The numerical precision of the conversion factors is important for numerical accuracy in trajectory computations. In general, a numerical precision of 1 part in $10^8$ in conversion factors is carried within the AOSS processor system. These calculations are familiar to any person skilled in ballistics science.

3.1.3 Atmospheric Parameters Determinations

The next initializing calculation relates to the environment at the firing point location. The first computation is the ratio of air density $\rho$ at the firing point to the air density $\rho_0$ at sea level standard conditions:

$$(\rho/\rho_0) = \{1.128363/[1 + 2.175644E{-}03 * T_F]\}(P/29.52756)[1 - 0.003783 * (RH) * P_{wtr}] \qquad (4)$$

where
- $\rho_0 = 7.544562E{-}02$ pound-weight per cubic foot
  $= 2.344925E{-}03$ pound-mass per cubic foot;
- $T_F$ is the ambient temperature at the firing point (degrees Fahrenheit);
- P is the ambient absolute atmospheric pressure (inches of mercury) at the firing point;
- RH is the ambient relative humidity (%) at the firing point;
- $P_{wtr}$ is the vapor pressure of water at the ambient temperature $T_F$.

The vapor pressure of water is determined from:

For $T_F < 0$ degrees Fahrenheit, $$V_{wtr} = 0.04 \text{ inch of mercury} \qquad (5)$$

For $0 \leq T_F < 40$ degrees Fahrenheit $$V_{wtr} = 0.0377 + 0.00138 T_F + 0.0000958 T_F^2 \text{ inches of mercury} \qquad (6)$$

For $40 \leq T_F < 80$ degrees Fahrenheit $$V_{wtr} = 0.2478 + 0.0081(T_F - 40) + 0.0002825(T_F - 40)^2 \text{ inches of Hg} \qquad (7)$$

For $T_F \geq 80$ degrees Fahrenheit $$P_{wtr} = 1.0323 + 0.03004(T_F - 80) + 0.000754(T_F - 80)^2 \text{ inches of Hg} \qquad (8)$$

Equations (4) through (8) support the computation of the air density ratio. The altitude of the firing location is needed for computation of the gravitational acceleration at the firing location and the ratio of the speed of sound at the firing location to the speed of sound at sea level standard conditions. If the altitude of the firing point is known to the firearm operator (from the GPS receiver, if present, a topographical map, or other source), it will have been entered into the processor system via the manual input port. If altitude is unknown, an approximation can be determined from:

$$L = -H_S \ln(\rho/\rho_0) \text{ (feet)} \qquad (9)$$

where
- L is the firing point altitude (feet), $$H_S = 33096.25 \text{ feet is the atmosphere scale height;} \qquad (10)$$

$\ln(\rho/\rho_0)$ is the natural logarithm of the air density ratio. Since this ratio is typically less than 1.0, the logarithm is typically negative.

The speed of sound ratio, called a, and is determined from:

$$a = (v_S/v_{S0}) = [1.0 - 1.126666E{-}05L - 6.753074E{-}11L^2] \\ * \{(T_F + 459.67)/(518.67 - 0.003566L)\}^{1/2} \qquad (11)$$

where
- $v_S$ is the speed of sound at the firing point;
- $v_{S0} = 1120.27$ feet per second is the speed of sound at sea level standard conditions.
- $T_F$ and L are defined above.

3.1.4 Gravitational Acceleration Determination

The computation in this step is the gravitational acceleration at the firing point:

$$g = 32.174[20856258/(20856258+L)]^2 \quad (12)$$

3.1.5 Trajectory Determination Initialization

Several parameters must be initialized to begin the trajectory calculation 2104. These include at least the following:
- Initial position coordinates are all set to zero values;
- Initial velocity components in computational coordinates are resolved from the muzzle velocity of the firearm;
- Time of flight is set to zero;
- Inclination angle θ (see Section 3.2) from the Inclination Angle Sensor is initialized;
- Gravitational acceleration is resolved along the computational coordinates;
- Wind components (if used) are resolved along computational coordinates. If wind is not treated in the processor system, wind components are set to zero;
- Slant range distance R to the target from the firearm (from the Rangefinder with corrections if the instrument is remote from the firearm);
- All parameters associated with the projectile (ballistic coefficient, drag coefficient, lift coefficient, overturning moment coefficient, etc.)

Other initializations may be required depending on the projectile dynamic model used for the trajectory calculation.

3.2 Coordinate System Definitions

Figure 22:
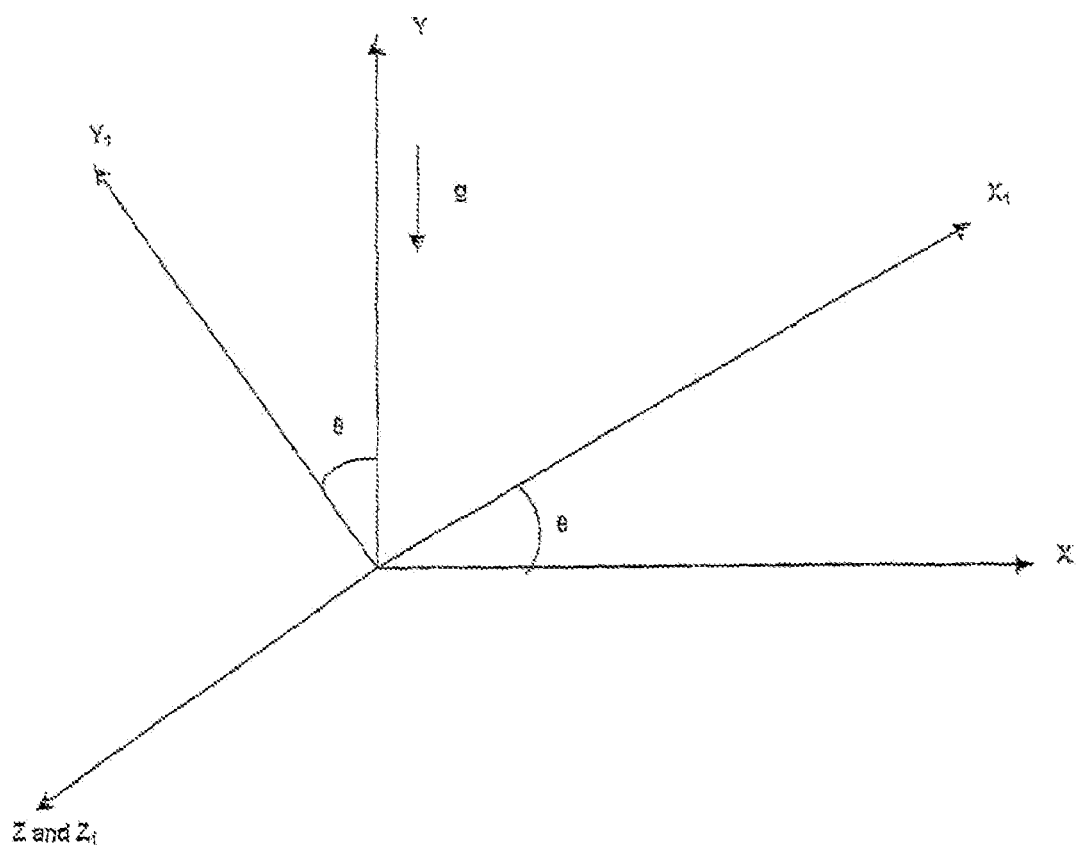
FIG. 22 depicts coordinate systems used in the trajectory determinations according to the present inventive concept.

FIG. 22 depicts the coordinate systems used in the trajectory determinations. The X, Y, Z coordinate system is a locally level frame with the X-Z plane being the horizontal plane. The local gravity vector is pointed in the negative Y direction. The vertical X-Y plane contains the target. If the target also is in the horizontal plane, the X-axis is then the line of sight of the firearm operator from the firing point through the target. However, for inclined targets the operator's line of sight is rotated upward or downward by an inclination angle θ, so that the firearm operator's line of sight is inclined relative to the level X-axis. This rotation forms the $X_1$, $Y_1$, $Z_1$ coordinate system, hereinafter referred to as the "slant range" coordinate system. The inclination angle θ is a rotation about the Z-axis, positive for elevated inclination angles and negative for depressed inclination angles. The $X_1$-axis is the firearm operator's line of sight from the firing point through the target.

The AOSS processor system determines the projectile's trajectory in $X_1$, $Y_1$, $Z_1$ (slant range) coordinates because trajectory parameters in these coordinates are most useful to the firearm operator. Some parameters, however, are input to the processor system in locally level coordinates, or are needed in locally level coordinates in the computations. The coordinate transformation from level coordinates to slant range coordinates is:

$$X_1 = X \cos\theta + Y \sin\theta$$

$$Y_1 = -X \sin\theta + Y \cos\theta$$

$$Z_1 = Z \quad (13)$$

The inverse transformation is:

$$X = X_1 \cos\theta - Y_1 \sin\theta$$

$$Y = X_1 \sin\theta + Y_1 \cos\theta$$

$$Z = Z_1 \quad (14)$$

3.3 Trajectory Determination

The vector differential equations of motion of a projectile in flight are usually written with time of flight as the independent variable. These equations will be familiar to any person skilled in ballistics science. For implementation in the AOSS software, a change of independent variable is made from time of flight to the slant range coordinate $X_1$. This change of variable is exact. No loss of precision or accuracy results, and, in fact, there is some evidence that accuracy is improved by this choice. The ordinary equations of motion are changed using the following:

$$(d/dt) = v_{x1}(d/dx_1) - \text{operator equivalence}$$

$$dt/dx_1 = 1/v_{x1}$$

$$dy_1/dx_1 = v_{y1}/v_{x1}$$

$$dz_1/dx_1 = v_{z1}/v_{x1}$$

$$d^2x_1/dt^2 = v_{x1}(dv_{x1}/dx_1)$$

$$d^2y_1/dt^2 = v_{x1}(dv_{y1}/dx_1)$$

$$d^2z_1/dt^2 = v_{x1}(dv_{z1}/dx_1) \quad (15)$$

This change of variables is believed novel in respect to ballistics software commercially available. It, however, has been used before in military applications where it is known as the China Lake Algorithm, and it has been published in unclassified literature.

Three dynamic models of a slender aerodynamic body in flight have been used. All three models treat the projectile as a rigid body spinning about its longitudinal axis. The simplest model characterizes the projectile as a point mass acted on by aerodynamic drag force and gravitational force. This is a three-degree-of-freedom (3DOF) model treating only the three linear degrees of freedom of the projectile. The most complex dynamic model differs from the 3DOF model in that it treats both the three linear and three rotational degrees of freedom and is known as the six-degrees-of-freedom (6DOF) model. This model is extremely complex and difficult to use. The third model is a modified characterization of the spinning projectile assuming that it is dynamically stable and treating only the strongest displacement effect of angular rotations. This is the so-called spin drift (also known as Yaw of Repose drift). This model also explains some second-order small deflections due to winds that are observed at long ranges. First-order wind deflections are treated in all three models, and all of the models can have Coriolis accelerations included in the equations of motion.

Numerical integration of the equations of motion is performed in the processor system. As is well known to those skilled in mathematics, numerical integration is an iterative process beginning with the initial conditions on all variables and ending when a final condition is reached. For the AOSS, the final condition is reaching the slant range distance of the target. A terminal value of any other integration variable or any combination of terminal values of integration variables required for the application of the firearm may, however, be used. Any one or more of several numerical integration techniques may be used to integrate the equations of motion. These include Taylor series expansions, Runge-Kutta of $2n^d$ or higher order, and several predictor-corrector techniques well known to mathematicians. Because some trajectory variables change smoothly and slowly with distance while others change sharply and rapidly, different integration techniques may be used for different equations of motion. And, in fact, closed form solutions may exist for certain integration variables. Examples are the deflections caused by crosswind and vertical wind in the 3DOF model.

3.3.1 Three Degree-of-freedom (3DOF) Model of Projectile Flight

The 3DOF model assumes that the projectile is ideally stabilized during flight. When the model is augmented to include Coriolis accelerations, the resulting trajectories are computationally accurate to range distances of at least 1000 yards. Two versions of the 3DOF model are used. The first version is taken from classical ballistics theory (Reference 1) and makes use of a drag function and a ballistic coefficient to determine the aerodynamic drag force on a projectile. This version is used in commercial applications because ballistic coefficients measured for the G1 drag function are routinely available for commercial bullets and loaded ammunition. The second version has been used for military projectiles since shortly after the end of World War II. Aerodynamic drag on each projectile is measured and then characterized by a coefficient of drag (for the 3DOF model, more coefficients for the 6DOF model). The coefficient of drag is available from military sources only for projectiles used in military small arms, and a very limited number of commercial bullets used by the military and law enforcement organizations. In the slant range $X_1, Y_1, Z_1$ coordinate system the equations of motion of these models are:

3.3.1.1 Classical 3DOF Model $$v_{x1}(dv_{x1}/dx_1) = -E^*(v_{x1} - v_{Wx1}) - g\sin\theta$$

$$v_{x1}(dv_{y1}/dx_1) = -E^*(v_{y1} - v_{Wy1}) - g\cos\theta$$

$$v_{x1}(dv_{z1}/dx_1) = -E^*(v_{z1} - v_{Wz1})$$

$$dt/dx_1 = 1/v_{x1}$$

$$dy_1/dx_1 = v_{y1}/v_{x1}$$

$$dz_1/dx_1 = v_{z1}/v_{x1} \tag{16}$$

where $v_{x1}, v_{y1}$, and $v_{z1}$ are components of projectile velocity with respect to the launch point resolved along the slant range coordinate axes;

$v_{Wx1}, v_{Wy1}$, and $v_{Wz1}$ are components of the wind velocity with respect to the ground resolved along the slant range coordinate axes;

g is the gravitational acceleration at the instantaneous projectile location;

$$E = [(\rho/\rho_0)^* a^* G1(v_r/a)]/C \tag{17}$$

$\rho/\rho_0$ is the instantaneous air density ratio at the projectile location from Equation (4);

$a = v_S/v_{S0}$ is the speed of sound ratio at the projectile location from Equation (11);

$G1(v_r/a)$ denotes the G1 drag function evaluated at the speed $y_r$ divided by a;

$v_r = \{(v_{x1} - v_{Wx1})^2 + (v_{y1} - v_{Wy1})^2 + (v_{z1} - v_{Wz1})^2\}^{1/2}$ is the speed of the projectile relative to the wind;

C is the ballistic coefficient of the projectile measured with respect to G1

Equation Set (16) is numerically integrated in the processor system to yield the two projectile position components $y_1$ and $z_1$, three projectile velocity components $v_{x1}, v_{y1}$, and $v_{z1}$, and time of flight t as functions of $x_1$, which is the range distance of the projectile from the firearm along the operator's line of sight.

The ballistic coefficient C varies with the speed of the projectile. For typical bullets C varies slowly with speed above about 1600 feet per second, and more rapidly at speeds below that number, especially near the speed of sound (1120.27 feet per second for the Army Standard Metro Atmosphere used for ballistics calculations). In this model C is allowed to change with speed, typically in a stepwise continuous manner.

3.3.1.2 Modern 3DOF Model $$v_{x1}(dv_{x1}/dx_1) = -k_{vs}*F*(v_{x1} - v_{wx1}) - g\sin\theta$$

$$v_{x1}(dv_{y1}/dx_1) = -k_{vs}*F*(v_{y1} - v_{wy1}) - g\cos\theta$$

$$v_{x1}(dv_{z1}/dx_1) = -k_{vs}*F*(v_{z1} - v_{wz1})$$

$$dt/dx_1 = 1/v_1$$

$$dy_1/dx_1 = v_{y1}/v_{x1}$$

$$dz_1/dx_1 = v_{z1}/v_{x1} \tag{18}$$

where $k_{vs} = 1.0 + 0.0014(RH - 78)(P_{wtr}/29.53)$ is the speed of sound correction to the air density;

$F = (\frac{1}{2}\rho SC_D v_r)/M$ $\rho$ is the instantaneous mass density of the air at the projectile location calculated from Equation (4) with $\rho_0 = 0.002344925$ pound-mass per cubic foot;

$P_{wtr}$ is the vapor pressure of water at the instantaneous ambient temperature at the projectile location;

$S = (\pi d^2/4)$ is the projectile reference area;

d is the projectile caliber (typically the diameter) in inches;

$C_D$ is the projectile drag coefficient;

M is the mass of the projectile (weight divided by 32.174 ft/sec$^2$) in pound-mass units;

All other parameters in Equation Set (18) are as defined for Equation Set (16).

Equation Set (18) is numerically integrated in the processor system to yield the two projectile position components $y_1$ and $z_1$, three projectile velocity components $v_{x1}, v_{y1}$, and $v_{z1}$, and time of flight t as functions of $x_1$, which is the range distance of the projectile from the firearm along the operator's line of sight.

The drag coefficient $C_D$ is measured for each type of projectile (but with more difficulty than the ballistic coefficient), and it varies strongly with the speed of the projectile especially near the speed of sound. After $C_D$ has been measured, a functional representation of its behavior in different speed regions is obtained by fitting suitably chosen mathematical functions to the measured data. These functions are used in the numerical integration.

3.3.1.3 Coriolis Accelerations in the 3DOF Model

Coriolis accelerations cause deflections to the 3DOF trajectory determined from Equation Sets (16) or (18) which become significant (deflections on the order of an inch or more) at range distances greater than about 800 yards or meters for typical sporting and military rifle cartridges. To account for Coriolis deflections to the trajectory, the following three acceleration terms are added algebraically to the first three equations of each Equation Set (16) or (18):

$$a_{CorX1} = 2\Omega_E[-v_{y1}\cos Lat \sin Az + v_{z1}(\cos Lat \cos Az \sin\theta - \sin Lat \cos\theta)]$$

$$a_{CorY1} = 2\Omega_E[v_{x1}\cos Lat \sin Az + v_{z1}(\cos Lat \cos Az \cos\theta + \sin Lat \sin\theta)]$$

$$a_{CorZ1} = 2\Omega_E[v_{x1}(\sin Lat \cos\theta - \cos Lat \cos Az \sin\theta) - v_{y1}(\cos Lat \cos Az \cos\theta + \sin Lat \sin\theta)] \tag{19}$$

where $\Omega_E = 7.2772E-05$ radians per second is the angular rate of the earth about the polar axis Lat is the latitude of the firing point, positive for the northern hemisphere and negative for the southern hemisphere;

Az is the azimuth angle of fire, positive for firing directions to the east of north and negative for firing directions to the west of north.

And other variables in Equation Set (19) are as defined above.

The azimuth angle of fire Az is measured by a magnetic compass. Azimuth angle is referenced to true geodetic north, while a magnetic compass indicates the direction of the local magnetic north as viewed at the firing site. The angular difference between geodetic north and magnetic north is defined as the magnetic declination. It is known that the magnetic declination at any fixed location on earth changes with time. Changes of a degree or two can occur over periods as small as five years. It is also known that magnetic declination varies with location on the earth, and this variation can be large. Geomagnetic maps of the earth are available (e.g., from the National Geophysical Data Center), and for nearly all regions of the earth including ocean areas, these maps show the magnetic declination at latitude and longitude coordinates. The approach used in the processor system is to (1) obtain a geomagnetic map of the area on the earth where the firearm is to be used, (2) construct a grid in latitude and longitude coordinates listing the magnetic declinations at each point on the grid, a (3) fit a polynomial(s) in latitude and longitude to the magnetic declinations. Enter the polynomial(s) into the processor system via the manual input port for long term storage. Then, for firearm operation at any position within the gridmap, the magnetic declination can be determined when needed for the Coriolis corrections. In some cases an average magnetic declination may serve for a sizable operational area. In such a case, the firearm operator can enter that average magnetic declination into the processor system, obviating the necessity of the polynomial(s). This approach must be used when latitude and longitude data are not available, e.g., when a GPS receiver is not available. With the magnetic declination known, the azimuth angle is obtained by algebraically adding the declination to the magnetic bearing of the target obtained from the magnetic compass.

3.3.1.4 Bullet Path Determination

The bullet path is defined as the perpendicular distance from the line of sight of the AOSS to the bullet location in the vertical X1-Y1 plane. The bullet path is therefore the position of the bullet projected into that vertical plane that the firearm operator would "see" as the bullet flies toward the target. This definition applies for all inclination angles of fire.

3.3.1.4.1 Bullet Path Determination for the Reference Trajectory

As explained earlier, a reference trajectory will be calculated when the firearm is initially sighted in by the firearm operator on a convenient firing range before the operational environment is entered. It is advantageous to determine a bullet path for that reference trajectory, mainly for observation by the firearm operator(s).

The reference bullet path at any range distance R on the reference trajectory 2105 is determined from:

$$BP(R) = R^*[(h_s - y_0)/R_0] - D(R)\cos(\theta_{ref} + \beta)^* \{1 + [(h_s - y_0)/R_0]^*\tan(\theta_{ref} + \beta)\} \quad (20)$$

where

R is the slant range distance from the firearm to the target;
BP(R) is the bullet path determined at range distance R;
$h_s$ is the sight height, that is, the distance of the AOSS optical axis from the centerline of the firearm bore at the objective lens of the AOSS;

$R_0$ is the zero range of the reference trajectory (i.e., the distant range distance where the projectile descends to cross the operator's line of sight;

$y_0 = y(R_0)$ is the y coordinate of the trajectory at the zero range $R_0$ (always negative for the slant range coordinate system used herein);

$\theta_{ref}$ is the inclination angle of the reference trajectory. Ordinarily, the firearm will be sighted in on a level, or nearly level, firing range. In that case $\theta_{ref} \approx 0$. However, when the initial sight-in range has an inclination angle, $\theta_{ref}$ will be measured by the AOSS and stored;

$$D(R) = [-y(R)\sec(\theta_{ref} + \beta)]/\{1 - [v_Y(R)/v_X(Rr)]^*\tan(\theta_{ref} + \beta)\} \quad (21)$$

D(R) denotes a drop variable evaluated at range distance R;
y(R) is the y coordinate of the reference trajectory evaluated at range distance R (always negative for the slant range coordinate system used herein);
$\theta_{ref}$ is the inclination angle of the reference trajectory. This value will be stored in the processor system for future use;
$\beta = \tan^{-1}(-y_0/R_0) \approx -y_0/R_0$ (a small angle) from Section 1.0;
$v_X(R)$ is the speed of the bullet in the x reference axis direction;
$v_Y(R)$ is the speed of the bullet in the y reference axis direction.

3.3.1.4.2 Bullet Path Determination for the Actual Trajectory

On the actual trajectory the projectile has coordinates $x_1$, $y_1$, $z_1$, and the $x_1$-axis is inclined at a measured angle $\theta$ with respect to the local level. The angle $\beta$ is unchanged from the reference trajectory value defined in the preceeding Section 3.3.1.4.1. The bullet path on the actual trajectory 2106 is determined from:

$$BP(x_1) = x_1^*[(h_s - y_0)/R_0] - D(x_1)\cos(\theta + \beta)^* \{1 + [(h_s - y_0)/R_0]^*\tan(\theta + \beta)\} - h_s \quad (22)$$

where $x_1$ is the slant range coordinate of the projectile;
$BP(x_1)$ is the actual bullet path evaluated at $x_1$;
$R_0$, $y_0$, $\beta$, and $h_s$ are as defined in the previous Section 3.3.1.4.1;
$\theta$ is the inclination angle of the actual trajectory;

$$D(x_1) = [-y_1(x_1)\sec(\theta + \beta)]/\{1 - [v_{Y1}(x_1)/v_{X1}(x_1)]^*\tan(\theta + \beta)\} \quad (23)$$

$D(x_1)$ denotes a drop variable evaluated at range distance $x_1$ on the actual trajectory;
$y_1(x_1)$ is the y coordinate of the actual trajectory evaluated at range distance $x_1$ (always negative for the slant range coordinate system used herein);
$v_{x1}(x_1)$ is the speed of the bullet in the $x_1$-axis direction;
$v_{Y1}(x_1)$ is the speed of the bullet in the $y_1$-axis direction.

This bullet path computation is made wherever needed on the actual trajectory. It is especially needed at the endpoint of the trajectory, where the bullet path becomes the aiming adjustment in the elevation direction with respect to the elevation "home" position.

3.3.2 Six Degree-of-freedom (6DOF) Model of Projectile Flight

When the angular motions of a projectile in flight are of interest, the 6DOF model is necessary. The six equations of motion for the 6DOF model are analytically complex, and the integration of these equations is computationally complex. The 6DOF equations and their solutions are described in E. J. McShane et al., "Exterior Ballistics," University of Denver Press, 1953; and R. L. McCoy, "Modern Exterior Ballistics," Schiffer Publishing, Ltd., Atglen, Pa., 1999. This model has been used extensively by the military to study projectile motions in flight and for targeting long range, heavy caliber guns, using large computers. It has been found that the full 6DOF model is not necessary for small arms which have more limited effective ranges. Thus, the full 6DOF model has not been implemented for application in the AOSS processor system.

Studies of projectile angular motions during flight have shown some "average" or "steady" yaw and pitch angles, resulting from gyroscopic stabilization of the projectile, which either cause or respond to small aerodynamic forces and moments of torque applied to the projectile. The largest of these effects for a well stabilized projectile is the Yaw of Repose, which causes a vertical moment of torque, which in turn causes the projectile to nose downward as it flies so that the longitudinal axis remains almost exactly tangent to the trajectory path. An associated small aerodynamic force acts in the horizontal plane to cause the projectile to deflect horizontally. This is known as Yaw of Repose drift or "spin" drift. An approximate equation for this horizontal deflection has been derived from the 6DOF model and is used to augment the 3DOF model, as explained in the next Section. The Yaw of Repose deflection at 1000 yards for a typical military bullet is a few inches and grows with increased range distance. This must be compensated for long range accuracy.

The next most important effect concerns deflections caused by winds. It is well known that a crosswind will cause a horizontal crossrange deflection of a projectile in a direction to follow the wind. This deflection is first-order small compared to the range distance, but appreciable compared to the extent of the target. This deflection is included in the 3DOF model if the wind speed and direction are known within the processor system. Less well known is the observation that a crosswind also will cause a second-order small vertical deflection of the projectile. This vertical deflection is typically about 10 percent of the crossrange deflection. Similarly, a vertical wind will cause, principally, a vertical deflection of the projectile, and also a smaller horizontal deflection. The 6DOF model explains why these smaller deflections orthogonal to the wind directions occur, but they are not included in the 3DOF model for practical reasons concerned with wind velocity estimations over long ranges of fire.

As small arms improve in range and accuracy and as processor systems improve in speed and memory capacity, it may happen that the full 6DOF model may be implemented for future AOSS applications.

3.3.3 Modified 3DOF Model of Projectile Flight

The modified 3DOF model of projectile flight implemented in the AOSS processor system consists of the basic 3DOF model of Section 3.3.1 augmented with the Coriolis accelerations of Section 3.3.1.3 and the acceleration caused by the Yaw of Repose. The acceleration caused by the Yaw of Repose is only in the $Z_1$ direction and is given by:

$$a_{Z1spin} = [(8I_{long}pg)/(\pi\rho_0 d^3 v_r^2 C_{M\alpha})] * [aG1(v_r/a)/C] \quad (24)$$

for the classical 3DOF model and $$a_{Z1spin} = (C_D I_{long} pg)/(M d v_r C_{M\alpha}) \quad (25)$$

for the modern 3DOF model.

In Equations (24) and (25)
  $a_{z1spin}$ is the acceleration caused by the Yaw of Repose and is positive for right-handed projectile spin about the longitudinal axis (as viewed from the rear of the projectile) and is negative for left-handed spin;
  $I_{long}$ is the axial moment of inertia of the projectile;
  p is the projectile spin rate, normally in radians per second;
  g is the value of gravitational acceleration at the projectile location given by Equation (12);

$\rho_0 = 0.0023342$ pound-mass per cubic foot is the density of air at sea level standard conditions;
  d is the reference diameter of the bullet (normally the principal diameter);
  $v_r$ is the speed of the projectile relative to the wind, defined following Equation (17) above;
  a is the speed of sound ratio at the projectile location given by Equation (11);
  $G1(v_r/a)$ is the G1 drag function evaluated at the speed $y_r$ divided by a;
  C is the ballistic coefficient of the projectile measured with respect to drag function G1;
  M is the projectile mass (projectile weight divided by 32.174 feet per second-squared)
  $C_{M\alpha}$ is the overturning moment coefficient for the projectile.

Measurements of $C_{M\alpha}$ have been made for projectiles used by the military. For sporting bullets approximations are used:
  $C_{M\alpha} = 0.57$ ($L_B/d$) for $v_r \geq 2000$ feet per second (see, D. G. Miller, "New Rule for Estimating Rifling Twist," personal communication and Precision Shooting (magazine), March-April, 2005)
  $= 0.544$ ($L_B/d$) for $1250 \leq v_r < 2000$ feet per second (see R. L. McCoy, "Modern Exterior Ballistics," Schiffer Publishing, Ltd., Atglen, Pa., 1999)
  $= 0.475$ ($L_B/d$) for $940 \leq v_r < 1250$ feet per second (see R. L. McCoy, "Modern Exterior Ballistics," Schiffer Publishing, Ltd., Atglen, Pa., 1999)
  $= 0.415$ ($L_B/d$) for $v_r < 940$ feet per second (see R. L. McCoy, "Modern Exterior Ballistics," Schiffer Publishing, Ltd., Atglen, Pa., 1999)
  where ($L_B/d$) is the overall length to diameter ratio for the projectile.

These approximations are considered "typical" but may lack accuracy for sporting purposes at very long range distances.

Listed below are the modified 3DOF equations of motion implemented in the AOSS processor system for either the classical or the modern approach:

$$v_{x1}(dv_{x1}/dx_1) = -E^*(v_{x1} - v_{Wx1}) - g \sin\theta + a_{CorX1}$$

$$v_{x1}(dv_{y1}/dx_1) = -E^*(v_{y1} - v_{Wy1}) - g \cos\theta + a_{CorY1}$$

$$v_{x1}(dv_{z1}/dx_1) = -E^*(v_{z1} - v_{Wz1}) + a_{CorZ1} + a_{Z1spin}$$

$$dt/dx_1 = 1/v_{x1}$$

$$dy_1/dx_1 = v_{y1}/v_{x1}$$

$$dz_1/dx_1 = v_{z1}/v_{x1}$$

$$E = [(\rho/\rho_0)^* a^* G1(v_r/a)]/C \quad \text{(Classical Model) (26)}$$

$$v_{x1}(dv_{x1}/dx_1) = -k_{vs}^* F^*(v_{x1} - v_{wx1}) - g \sin\theta + a_{CorX1}$$

$$v_{x1}(dv_{y1}/dx_1) = -k_{vs}^* F^*(v_{y1} - v_{wy1}) - g \cos\theta + a_{CorY1}$$

$$v_{x1}(dv_{z1}/dx_1) = -k_{vs}^* F^*(v_{z1} - v_{wz1}) + a_{CorZ1} + a_{Z1spin}$$

$$t/dx_1 = 1/v_{x1}$$

$$dy_1/dx_1 = v_{y1}/v_{x1}$$

$$dz_1/dx_1 = v_{z1}/v_{x1}$$

$$F = (\frac{1}{2}\rho S C_D v_r)/M \quad \text{(Modern Model)(27)}$$

All terms and parameters in Equation Sets (26) and (27) are as previously defined. When the classical or modern model is chosen, either Equation Set (26) or (27) is implemented in the processor system. The chosen set is numerically integrated from the firing point to the target located on the $X_1$-axis. It has been found that a constant integration step size $\Delta x_1$ equal to 1 yard or 1 meter provides adequate speed and excellent numerical accuracy. This step size is convenient because the range distances to the target are known with a precision of a yard or meter. A number of accuracy tests, however, have been applied by mathematicians to increase the speed of the numerical computations by lengthening the integration step, and one or more of these mathematical policies can be used in the processor system.

3.3.4 Endpoint Determinations for Each Integration Step

At the endpoint of each integration step, several calculations take place.

3.3.4.1 Updates to All Integration Variables $x_{1new} = x_{1previous} + \Delta x_1$ (independent variable update)

$Y_{1new} = y_{1previous} + \Delta y_1$ (determined by the integration equations)

$z_{1new} = z_{1previous} + \Delta z_1 a$ (determined by the integration equations)

$t_{new} = t_{previous} + \Delta t$ (determined by the integration equations)

$v_{X1new} = v_{X1previous} + \Delta V_{X1}$ (determined by the integration equations)

$V_{Y1new} = V_{Y1previous} + \Delta v_{Y1}$ (determined by the integration equations)

$v_{Z1new} = v_{Z1previous} + \Delta v_{Z1}$ (determined by the integration equations)

3.3.4.2 Test for the Integration Endpoint

The updated $x_1$ variable is tested against the range distance to the target:

$x_{1new} = R_{target}$

If the answer to this question is yes, trajectory integration is stopped. If the answer is no, the trajectory integration continues.

3.3.4.3 Updates to Air Density Ratio, Speed of Sound Ratio, and Gravitational Acceleration $(\rho/\rho_0) = (\rho/\rho_0)_{FP} * e^{-h/H_s}$ $a = (v_S/v_{S0}) = [1.0 - 1.126666E{-}05(L+h) - 6.753074E{-}11$
$(L+h)^2]* \{(T_F + 459.67)/[518.67. - 0.003566(L+h)]$
$\}^{1/2}$ $g = 32.174[20856258/(20856258 + L+h)]^2$ where
  $(\rho/\rho_0)_{FP}$ is the air density ratio calculated at the firing point, given by Equation (4).
  L is the altitude of the firing point above sea level
    h is the altitude of the projectile above the firing point
    $h = x_{1new} \sin\theta + y_{1new} \cos\theta$
  h is the altitude of the projectile above the firing point $h = x_{1new} \sin\theta + y_{1new} \cos\theta$ $T_F$ is the ambient temperature at the firing point;
$H_S = 33096.25$ feet is the scale height of the atmosphere
3.3.5 Aiming Adjustment Determinations at Integration Endpoint When the integration endpoint of the actual trajectory is reached, the processor system has calculated the final values $y_{1final}$ and $z_{1final}$ at the target location $x_{1final} = R_{target}$. A final bullet path value $BP(R_{target})$ is calculated from Equation (22) with $x_1 = x_{1final} = R_{target}$.

The aiming adjustments for the optical sight in elevation and windage directions are then determined:

Elevation Adjustment = $BP(R_{target})$

Windage Adjustment = $z_{1final}$

These adjustments are with respect to the "home" position of the optical assembly. A positive value of BP means that the projectile impact point at the target must be lowered; a negative value means that it must be raised. A positive value of $z_{1final}$ means that the projectile impact point at the target must be moved to the shooter's left; a negative value means that the impact point must be moved to the shooter's right.

3.3.6 Actuator Command Determinations

The final processor system function, which follows completion of the aiming adjustment determinations, is the determination of adjustment commands for the elevation 2107, windage 2108, and parallax 2109 actuators, as shown in FIG. 21. The actuators are electromechanical assemblies using bi-directional motors to move the optical axis in elevation and windage directions, and an optical element internal to the optics assembly to correct for parallax. From the electromechanical design, the processor system will have scale factors of the forms:

$K_{elevation}$ MOA per pulse for a stepping motor, or per analog signal unit (e.g. millivolt or milliamp) for an analog servo motor;
  $K_{windage}$ MOA per pulse for a stepping motor, or per analog signal unit (e.g. millivolt or milliamp) for an analog servo motor;
  $K_{parallax}$ yard of parallax correction of the optical assembly per pulse for a stepping motor, or per analog signal unit (e.g. millivolt or milliamp) for an analog servo motor.

The AOSS concept uses stepper motors for hardware simplicity and reliability. Servomechanisms, however, may also be used. The commands in the processor system are then determined from:

Elevation Command = $\{[BP(R_{target})/R_{target}]/K_{elevation}$

Windage Command = $(z_{1final}/R_{target})/K_{windage}$

Parallax Command = $(R_{target} - R_0)/K_{parallax}$ where
  $BP(R_{target})$ is the bullet path evaluated at the endpoint of the trajectory, as defined in Section 3.3.5;
  $z_{1final}$ is the $z_1$ coordinate of the trajectory evaluated at $x_{1final} = R_{target}$;
  $R_0$ is the zero range on the reference trajectory. See Section 1.0.

These commands are in units of positive or negative pulse counts or analog signal units and are directly issued to the actuator driver subassemblies.

When confirmation is received by the processor system that the commands have been executed, a signal will be displayed within view by the operator to alert that person to initiate the firing sequence of the firearm.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed:

1. An automatic optical sighting system, comprising:
an adjustable optical system comprising at least one prism having an adjustable position;
at least one sensor detecting a condition that affects a trajectory of a projectile between an origin and a selected target and generating an indication of the detected condition; and
a processor receiving information related to each detected condition and information related to a position of the at least one prism, the processor determining at least one position adjustment to the at least one prism based on at least one detected condition and the position of the at least one prism so that the projectile will have a trajectory between the origin and the selected target that helps the projectile to hit the target.

2. The automatic optical sighting system according to claim 1, wherein position adjustment comprises an elevation adjustment, a windage adjustment or a parallax adjustment.

3. The automatic optical sighting system according to claim 1, wherein the processor generates a control signal that controls at least one position adjustment of the at least one prism.

4. The automatic optical sighting system according to claim 3, further comprising:
at least one actuator corresponding to each position adjustment of the adjustable optical system, each actuator being mechanically coupled to the corresponding position adjustment; and
an actuator controller corresponding to each actuator, each actuator controller controlling the corresponding actuator in response to a corresponding control signal generated by the processor for the position adjustment.

5. The automatic optical sighting system according to claim 1, wherein the processor further determines at least one position adjustment for the adjustable optical system that is based on a secondary factor that affects the trajectory of the projectile between the origin and the selected target, the secondary factor being related to a Coriolis effect or a gyroscopic effect, or a combination thereof.

6. The automatic optical sighting system according to claim 1, wherein the adjustable optical system comprises an optical pathway, the optical pathway comprising a first portion extending along a first longitudinal axis of the automatic optical sighting system and a second portion extending along a second longitudinal axis of the automatic sighting system, the first and second longitudinal axes being parallel and different from each other.

7. The automatic optical sighting system according to claim 1, further comprising a housing comprising at least one actuator corresponding to a position adjustment of the optical system, the actuator being responsive to the determination of the processor by adjusting the position adjustment based on the determination, and the actuator being located internal to the housing.

8. An optical sighting system, comprising:
an adjustable optical system comprising an optical pathway, the optical pathway comprising a first portion extending along a first longitudinal axis of the automatic sighting system and a second portion extending along a second longitudinal axis of the automatic sighting system, the first and second longitudinal axes being parallel and different from each other; and
at least one prism that is part of the optical pathway and having an adjustable position.

9. The optical sighting system according to claim 8, further comprising:
at least one sensor detecting a condition that affects a trajectory of a projectile between an origin and a selected target and generating an indication of the detected condition; and
a processor receiving information related to each detected condition and information related to a position of the at least one prism, the processor determining at least one position adjustment to the at least one prism based on at least one detected condition and the position of the at least one prism so that the projectile will have a trajectory between the origin and the selected target that helps the projectile to hit the target.

10. The optical sighting system according to claim 9, wherein position adjustment comprises an elevation adjustment, a windage adjustment or a parallax adjustment.

11. The optical sighting system according to claim 9, wherein the processor generates a control signal that controls at least one position adjustment of the at least one prism.

12. The optical sighting system according to claim 11, further comprising:
at least one actuator corresponding to each position adjustment of the adjustable optical system, each actuator being mechanically coupled to the corresponding position adjustment; and
an actuator controller corresponding to each actuator, each actuator controller controlling the corresponding actuator in response to a corresponding control signal generated by the processor for the position adjustment.

13. The optical sighting system according to claim 9, wherein the processor further determines at least one position adjustment for the adjustable optical system that is based on a secondary factor that affects the trajectory of the projectile between the origin and the selected target, the secondary factor being related to a Coriolis effect or a gyroscopic effect, or a combination thereof.

14. The optical sighting system according to claim 9, further comprising a housing comprising at least one actuator corresponding to a position adjustment of the optical system, the actuator being responsive to the determination of the processor by adjusting the position adjustment based on the determination, and the actuator being located internal to the housing.

15. An automatic optical sighting system, comprising:
an adjustable optical system comprising at least one internal optical adjustment;
at least one sensor detecting a condition that affects a trajectory of a projectile between an origin and a selected target and generating an indication of the detected condition;
a processor receiving information related to each detected condition and information related to a state of the at least one internal optical adjustment, the processor determining at least one internal adjustment for the adjustable optical system based on at least one detected condition so that the projectile will have a trajectory between the origin and the selected target that helps the projectile to hit the target, and
a housing containing at least one actuator corresponding to an optical adjustment of the optical system, the actuator being responsive to the determination of the processor by adjusting the optical adjustment based on the determination, and the actuator being located internal to the housing.

16. The automatic optical sighting system according to claim 15, wherein position adjustment comprises an elevation adjustment, a windage adjustment or a parallax adjustment.

17. The automatic optical sighting system according to claim 15, wherein the processor generates a control signal that controls at least one position adjustment of the at least one prism.

18. The automatic optical sighting system according to claim 17, further comprising:
- at least one actuator corresponding to each position adjustment of the adjustable optical system, each actuator being mechanically coupled to the corresponding position adjustment; and
- an actuator controller corresponding to each actuator, each actuator controller controlling the corresponding actuator in response to a corresponding control signal generated by the processor for the position adjustment.

19. The automatic optical sighting system according to claim 15, wherein the processor further determines at least one position adjustment for the adjustable optical system that is based on a secondary factor that affects the trajectory of the projectile between the origin and the selected target, the secondary factor being related to a Coriolis effect or a gyroscopic effect, or a combination thereof.

20. The automatic optical sighting system according to claim 15, wherein the adjustable optical system comprises an optical pathway, the optical pathway comprising a first portion extending along a first longitudinal axis of the automatic optical sighting system and a second portion extending along a second longitudinal axis of the automatic sighting system, the first and second longitudinal axes being parallel and different from each other.

* * * * *